United States Patent
Lima et al.

(10) Patent No.: US 9,923,714 B2
(45) Date of Patent: *Mar. 20, 2018

(54) SECURE NETWORK CODING FOR MULTI-RESOLUTION WIRELESS TRANSMISSION

(71) Applicant: Massachusetts Institute of Technology, Cambridge, MA (US)

(72) Inventors: Luisa Lima, Oporto (PT); Steluta Gheorghiu, Corbera de Llobregat (ES); Joao Barros, Oporto (PT); Muriel Medard, Belmont, MA (US); Alberto Lopez Toledo, Brooklyn, NY (US); Joao Vilela, Coimbra (PT)

(73) Assignees: Massachusetts Institute of Technology, Cambridge, MA (US); Universidade Do Porto, Oporto (PT); Telefonica, S.A., Madrid (ES)

( * ) Notice: Subject to any disclaimer, the term of this patent is extended or adjusted under 35 U.S.C. 154(b) by 43 days.

This patent is subject to a terminal disclaimer.

(21) Appl. No.: 14/822,115

(22) Filed: Aug. 10, 2015

(65) Prior Publication Data
US 2015/0372809 A1    Dec. 24, 2015

Related U.S. Application Data

(63) Continuation of application No. 13/836,981, filed on Mar. 15, 2013, now Pat. No. 9,137,492, which is a
(Continued)

(51) Int. Cl.
*H04L 9/32*    (2006.01)
*H04L 9/08*    (2006.01)
(Continued)

(52) U.S. Cl.
CPC .......... *H04L 9/0819* (2013.01); *H04L 1/1812* (2013.01); *H04L 63/0428* (2013.01);
(Continued)

(58) Field of Classification Search
None
See application file for complete search history.

(56) References Cited

U.S. PATENT DOCUMENTS 5,577,056 A    11/1996   Malik et al.
6,128,773 A    10/2000   Snider
(Continued)

FOREIGN PATENT DOCUMENTS

EP    1 638 239 A1    3/2006
WO    WO 2007/109216 A1    9/2007
(Continued)

OTHER PUBLICATIONS

U.S. Appl. No. 14/678,359, filed Apr. 3, 2015, Zeger, et al.
(Continued)

*Primary Examiner* — Brandon Hoffman
(74) *Attorney, Agent, or Firm* — Daly, Crowley, Mofford & Durkee, LLP

(57) ABSTRACT

Described herein is a method and system for hierarchical wireless video with network coding which limits encryption operations to a critical set of network coding coefficients in combination with multi-resolution video coding. Such a method and system achieves hierarchical fidelity levels, robustness against wireless packet loss and efficient security by exploiting the algebraic structure of network coding.

27 Claims, 11 Drawing Sheets

Related U.S. Application Data continuation of application No. 13/071,674, filed on Mar. 25, 2011, now Pat. No. 8,571,214.

(60) Provisional application No. 61/317,532, filed on Mar. 25, 2010.

(51) Int. Cl.

| | | |
|---|---|---|
| *H04L 1/18* | (2006.01) | |
| *H04N 21/2343* | (2011.01) | |
| *H04N 21/2347* | (2011.01) | |
| *H04N 21/266* | (2011.01) | |
| *H04N 21/2662* | (2011.01) | |
| *H04N 21/61* | (2011.01) | |
| *H04N 21/6377* | (2011.01) | |
| *H04N 21/647* | (2011.01) | |
| *H04N 7/167* | (2011.01) | |
| *H04W 12/06* | (2009.01) | |
| *H04L 29/06* | (2006.01) | |
| *H04L 1/00* | (2006.01) | |

(52) U.S. Cl.
CPC ......... *H04N 7/167* (2013.01); *H04N 21/2347* (2013.01); *H04N 21/234327* (2013.01); *H04N 21/2662* (2013.01); *H04N 21/26613* (2013.01); *H04N 21/6131* (2013.01); *H04N 21/6377* (2013.01); *H04N 21/64792* (2013.01); *H04W 12/06* (2013.01); *H04L 2001/0097* (2013.01); *H04L 2209/24* (2013.01)

(56) References Cited

U.S. PATENT DOCUMENTS

| | | |
|---|---|---|
| 6,621,851 B1 | 9/2003 | Agee et al. |
| 6,885,653 B2 | 4/2005 | Choi et al. |
| 7,064,489 B2 | 6/2006 | Price |
| 7,071,853 B2 | 7/2006 | Price |
| 7,095,343 B2 | 8/2006 | Xie et al. |
| 7,164,691 B2 | 1/2007 | Knapp et al. |
| 7,283,564 B2 | 10/2007 | Knapp et al. |
| 7,349,440 B1 | 3/2008 | Chou et al. |
| 7,408,938 B1 | 8/2008 | Chou et al. |
| 7,414,978 B2 | 8/2008 | Lun et al. |
| 7,529,198 B2 | 5/2009 | Jain et al. |
| 7,706,365 B2 | 4/2010 | Effros et al. |
| 7,760,728 B2 | 7/2010 | Chou et al. |
| 7,821,980 B2 | 10/2010 | Chakrabarti et al. |
| 7,876,677 B2 | 1/2011 | Cheshire |
| 7,912,003 B2 | 3/2011 | Radunovic et al. |
| 7,945,842 B2 | 5/2011 | He |
| 8,040,836 B2 | 10/2011 | Wu et al. |
| 8,068,426 B2 | 11/2011 | Sundararajan et al. |
| 8,130,776 B1 | 3/2012 | Sundararajan et al. |
| 8,279,781 B2 | 10/2012 | Lucani et al. |
| 8,451,756 B2 | 5/2013 | Lucani et al. |
| 8,482,441 B2 | 7/2013 | Medard et al. |
| 8,504,504 B2 | 8/2013 | Liu |
| 8,571,214 B2 | 10/2013 | Lima et al. |
| 9,019,643 B2 | 4/2015 | Medard et al. |
| 9,025,607 B2 | 5/2015 | Zeger et al. |
| 2003/0055614 A1 | 3/2003 | Pelikan |
| 2003/0214951 A1 | 11/2003 | Joshi et al. |
| 2004/0203752 A1 | 10/2004 | Wojaczynski et al. |
| 2005/0010675 A1 | 1/2005 | Jaggi et al. |
| 2005/0078653 A1 | 4/2005 | Agashe et al. |
| 2005/0152391 A1 | 7/2005 | Effros et al. |
| 2005/0251721 A1 | 11/2005 | Ramesh et al. |
| 2006/0020560 A1 | 1/2006 | Rodriguez et al. |
| 2006/0146791 A1 | 7/2006 | Deb et al. |
| 2006/0224760 A1 | 10/2006 | Yu et al. |
| 2007/0046686 A1 | 3/2007 | Keller |
| 2007/0116027 A1 | 5/2007 | Ciavaglia et al. |
| 2007/0274324 A1 | 11/2007 | Wu et al. |
| 2008/0043676 A1 | 2/2008 | Mousseau et al. |
| 2008/0049746 A1 | 2/2008 | Morrill et al. |
| 2008/0123579 A1 | 5/2008 | Kozat et al. |
| 2008/0259796 A1 | 10/2008 | Abousleman et al. |
| 2008/0291834 A1 | 11/2008 | Chou et al. |
| 2008/0320363 A1 | 12/2008 | He |
| 2009/0003216 A1 | 1/2009 | Radunovic et al. |
| 2009/0135717 A1 | 5/2009 | Kamal et al. |
| 2009/0153576 A1 | 6/2009 | Keller |
| 2009/0175320 A1 | 7/2009 | Haustein et al. |
| 2009/0198829 A1 | 8/2009 | Sengupta et al. |
| 2009/0207930 A1 | 8/2009 | Sirkeci et al. |
| 2009/0238097 A1 | 9/2009 | Le Bars et al. |
| 2009/0248898 A1 | 10/2009 | Gkantsidis et al. |
| 2009/0285148 A1 | 11/2009 | Luo et al. |
| 2009/0310582 A1 | 12/2009 | Beser |
| 2009/0313459 A1 | 12/2009 | Horvath |
| 2009/0316763 A1 | 12/2009 | Erkip et al. |
| 2010/0014669 A1* | 1/2010 | Jiang ............... H04L 9/0637 380/255 |
| 2010/0046371 A1 | 2/2010 | Sundararajan et al. |
| 2010/0057636 A1 | 3/2010 | Brennan |
| 2010/0111165 A1 | 5/2010 | Kim et al. |
| 2010/0146357 A1 | 6/2010 | Larsson |
| 2011/0238855 A1 | 9/2011 | Korsunsky et al. |
| 2012/0057636 A1 | 3/2012 | Tian et al. |
| 2012/0218891 A1 | 8/2012 | Sundararajan et al. |
| 2012/0300692 A1 | 11/2012 | Sfar et al. |
| 2013/0107764 A1 | 5/2013 | Zeger et al. |
| 2013/0114481 A1 | 5/2013 | Kim et al. |
| 2013/0114611 A1 | 5/2013 | Zeger et al. |
| 2013/0195106 A1 | 8/2013 | Calmon et al. |
| 2014/0064296 A1 | 3/2014 | Haeupler et al. |
| 2014/0184273 A1 | 7/2014 | Feizi-Khankandi et al. |
| 2014/0185803 A1 | 7/2014 | Lima et al. |
| 2014/0268398 A1 | 9/2014 | Medard et al. |
| 2014/0269485 A1 | 9/2014 | Medard et al. |
| 2014/0269503 A1 | 9/2014 | Medard et al. |
| 2014/0269505 A1 | 9/2014 | Medard et al. |
| 2014/0280395 A1 | 9/2014 | Medard et al. |
| 2014/0280454 A1 | 9/2014 | Medard et al. |

FOREIGN PATENT DOCUMENTS

| | | |
|---|---|---|
| WO | WO 2010/005181 A2 | 1/2010 |
| WO | WO 2010/005181 A3 | 1/2010 |
| WO | WO 2011/043754 A1 | 4/2011 |

OTHER PUBLICATIONS

U.S. Appl. No. 14/668,185, filed Mar. 25, 2015, Medard, et al.
U.S. Appl. No. 14/297,090, filed Jun. 5, 2014, Kim, et al.
U.S. Appl. No. 14/208,683, filed Mar. 13, 2014, Calmon, et al.
U.S. Appl. No. 13/890,604, filed May 9, 2013, Zeger, et al.
U.S. Appl. No. 13/655,034, filed Oct. 18, 2012, Medard, et al.
U.S. Appl. No. 13/654,953, filed Oct. 18, 2012, Zeger, et al.
Ahlswede, et al.; "Network Information Flow;" IEEE Transactions on Information Theory; vol. 46; No. 4; Jul. 2000; pp. 1204-1216.
Bellare, et al.; "A Concrete Security Treatment of Symmetric Encryption: Analysis of the DES Modes of Operation;" Proc. 38$^{th}$ Annual Symposium on Foundations of Computer Science; Oct. 1997; pp. 1-32.
Costa, et al.; "Informed Network Coding for Minimum Decoding Delay;" Fifth IEEE International Conference on Mobile Ad-hoc and Sensor Systems; Sep. 2008; pp. 80-91.
"Data Service Options for Spread Spectrum Systems: Radio Link Protocol Type 3;" 3GPP2 C.S0017-010-A; Version 2.0; Sep. 2005.
Fragouli, et al.; "Wireless Network Coding: Opportunities & Challenges;" MILCOM; Oct. 2007.
Frossard, et al.; "Media Streaming with Network Diversity;" Proc. IEEE; vol. 96; No. 1; Jan. 2008; pp. 39-53.
Gkantsidis, et al.; "Cooperative Security for Network Coding File Distribution;" Proc. IEEE Infocom; Apr. 2006.
"Guest Editorial Wireless Video Transmission;" IEEE Journal on Selected Areas in Communications; vol. 28; No. 3; Apr. 2010; pp. 297-298.

(56) References Cited

OTHER PUBLICATIONS

Ho, et al.; "A Random Linear Network Coding Approach to Multicast;" IEEE Transactions on Information Theory; vol. 52; No. 10; Oct. 2006, pp. 4413-4430.
Jaggi, et al.; "Resilient Network Coding in the Presence of Byzantine Adversaries;" Proc. IEEE INFOCOM; May 2007.
Jin, et al.; "Is Random Network Coding Helpful in WiMax;" IEEE $27^{th}$ Conference on Computer Communications; Apr. 2008; pp. 2162-2170.
Katti, et al.; "XORs in the Air: Practical Wireless Network Coding;" IEEE/ACM Transactions on Networking; Jun. 2008; pp. 497-510.
Han, et al.; "On Nework Coding for Security;" IEEE Military Communications Conference; Oct. 2007; pp. 1-6.
Kritzner, et al.; "Priority Based Packet Scheduling with Tunable Reliability for Wireless Streaming;" Lecture Notes in Computer Science; 2004; pp. 707-717.
Lima, et al.; "An Information-Theoretic Cryptanalysis of Network Coding—is Protecting the Code Enough;" International Symposium on Information Theory and its Applications; Dec. 2008.
Lima, et al.; "Random Linear Network Coding: A free cipher?" IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 1-12.
Liu, et al.; "Using Layered Video to Provide Incentives in P2P Live Streaming;" P2P-TV07: Proceedings of the 2007 Workshop on Peer-to-peer Streaming and IP-TV; Aug. 2007; pp. 311-316.
Moyer, et al.; "A Survey of Security Issues in Multicast Communications;" IEEE Network; vol. 13; No. 6; Nov./Dec. 1999; pp. 12-23.
NS Version 1—LBNL Network Simulator; web page—http://ee.lel.gov/ns/; Mar. 21, 2011.
Oliveira, et al.; "A Network Coding Approach to Secret Key Distribution;" IEEE Transactions on Information Forensics and Security; vol. 3; No. 3; pp. 414-423; Sep. 2008.
Radunovic, et al.; "Horizon: Balancing TCP Over Multiple Paths in Wireless Mesh Network;" Proc. $14^{th}$ ACM International Conference on Mobile Computing and Networking; Sep. 2008; pp. 247-258.
Seferoglu, et al.; "Opportunistic Network Coding for Video Streaming over Wireless;" Packet Video; Nov. 2007; pp. 191-200.
Sundaram, et al.; "Multirate Media Streaming Using Network Coding;" Proc. $43^{rd}$ Allerton Conference on Communication, Control, and Computing; Sep. 2005.
Tosun, et al.; "Efficient Multi-Layer Coding and Encryption of MPEG Video Streams;" Proc. 2000 IEEE International Conference on Multimedia and Expo; vol. 1; 2000; pp. 119-122.
Tosun, et al.; "Lightweight Security Mechanisms for Wireless Video Transmission;" Proc. Intl. Conference on Information Technology, Coding and Computing; Apr. 2001; pp. 157-161.
Vilela, et al.; "Lightweight Security for Network Coding;" Proc. IEEE International Conference on Communications; May 2008.
Trung, et al.; "Quality Enhancement for Motion JPEG Using Temporal Redundancies;" IEEE Transactions on Circuits and System for Video Technology, vol. 18; No. 5; May 2008; pp. 609-619.
Widmer, et al.; "Network Coding for Efficient Communication in Extreme Networks;" Applications, Technologies, Architectures, and Protocols for Computer Communication; Aug. 2005; pp. 284-291.
Halloush, et al.; "Network Coding with Multi-Generation Mixing: Analysis and Applications for Video Communication;" IEEE International Conference on Communications; May 19, 2008; pp. 198-202.
Li, et al.; "Robust and Flexible Scalable Video Multicast with Network Coding over P2P Network;" $2^{nd}$ International Congress on Image and Signal Processing, IEEE: Oct. 17, 2009; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.

Magli, et al.; "An Overview of Network Coding for Multimedia Streaming;" IEEE International Conference; Jun. 28, 2009; pp. 1488-1491.
Vilela, et al.; "Lightweight Security for Network Coding;" IEEE International Conference on Communications; May 2008; pp. 1750-1754.
PCT Search Report of the ISA for PCT/US2011/029908 dated Jun. 28, 2011.
Written Opinion of the ISA for PCT/US2011/029908 dated Jun. 28, 2011.
Bharath-Kumar, et al.; "Routing to Multiple Destinations in Computer Networks;" IEEE Transactions on Communications; vol. Com-31; No. 3; Mar. 1983; pp. 343-351.
Cai, et al.; "Secure Network Coding;" IEEE; ISIT; Jun. 30-Jul. 5, 202; p. 323.
Chou, et al.; "Practical Network Coding;" Oct. 2003; pp. 40-49.
Demers, et al.; "Epidemic Algorithms for Replicated Database Maintenance;" PODC '87 Proceedings of the sixth annual ACM Symposium on Principles of distributed computing; Jan. 1987; pp. 1-12.
Effros; Distortion-Rate Bounds for Fixed-and Variable-Rate Multiresolution Source Codes; IEEE Transactions on Information Theory; vol. 45, No. 6; Sep. 1999; pp. 1887-1910.
Ho, et al.; "Byzantine Modification Detection in Multicast Networks using Randomized Network Coding;" IEEE; ISIT; Jun. 27-Jul. 2, 2004; 3 pages.
Ho, et al.; "On Randomized Network Coding;" invited paper, $41^{st}$ Allerton Annual Conference on Communications, Control and Computing; vol. 1; Oct. 2003; pp. 21-29.
Ho, et al.; "The Benefits of Coding over Routing in a Randomized Setting;" IEEE; ISIT Jun. 29-Jul. 4, 2003; p. 442.
Karp, et al.; "Randomized Rumor Spreading;" IEEE Proceeding FOCS '00 Proceedings of the 41st Annual Symposium on Foundations of Computer Science; Jan. 2000; pp. 565-574.
Kempe, et al.; "Protocols and Impossibility Results for Gossip-Based Communication Mechanisms;" Foundations of Computer Science, Jan. 2002; Proceedings. The $43^{rd}$ Annual IEEE Symposium; pp. 471-480.
Koetter, et al.; "An Algebraic Approach to Network Coding;" IEEE/ACM Transactions on Networking; vol. 11, No. 5; Oct. 2003; pp. 782-795.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "Linear Network Coding;" IEEE Transactions on Information Theory; vol. 49, No. 2; Feb. 2003; pp. 371-381.
Médard, et al.; "On Coding for Non-Multicast Networks;" invited paper, $41^{st}$ Allerton Annual Conference on Communication, Control; Outgrowth of supervised student research Publications of Muriel Médard and Computing; vol. 1; Oct. 2003; pp. 11-20.
Roughgarden, et al.; "How Bad is Selfish Routing?" Journal of the ACM; vol. 49, No. 2; Mar. 2002; pp. 236-259.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113.
Song, et al.; "Zero-Error Network Coding for Acyclic Networks;" IEEE Transactions on Information Theory; vol. 49, No. 12; Dec. 2003; pp. 3129-3139.
Wieselthier, et al.; "Energy-Aware Wireless Networking with Directional Antennas: The Case of Session-Based Broadcasting and Multicasting;" IEEE Transactions on Mobile Computing; vol. 1, No. 3; Jul.-Sep. 2002; pp. 176-191.
Wieselthier, et al.; "Energy Efficient Broadcast and Multicast Trees in Wireless Networks;" Mobile Networks and Applications 7; Jan. 2002; pp. 481-492.
Yeung; "Multilevel Diversity Coding with Distortion;" IEEE Transactions on Information Theory; vol. 41, No. 2; Mar. 1995; pp. 412-422.

(56) References Cited

OTHER PUBLICATIONS

International Preliminary Report on Patentability for PCT/US2001/029908 dated Oct. 4, 2012.
Rule 161 Communication dated Nov. 2, 2012 for EP Application No. 11713559.0.
Response to Rule 161 Communication filed May 13, 2013 for EP Application No. 11713559.0.
Article 94(3) Communication dated Aug. 30, 2013 for EP Application No. 11713559.0.
Response to Article 94(3) Communication filed Jan. 24, 2014 for EP Application No. 11713559.0.
Abichar, et al.; "WiMax vs. LTE: Who Will Lead the Broadband Mobile Internet?;" Mobile Computing; IEEE Computer Society; IT Pro May/Jun. 2010; pp. 26-32.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.
Acedanski, et al.; "How Good is Random Linear Coding Based Distributed Network Storage?;" Proc. $1^{st}$ Workshop on Network Coding, Theory, and Applications (Netcod'05); Apr. 2005; 6 pages.
Adamson, et al.; "Multicast Negative-Acknowledgment (NACK) Building Blocks;" Internet Engineering Task Force (IETF),RFC; vol. 5401; Nov. 2008; 42 pages.
Adamson, et al.; "NACK-Oriented Reliable (NORM) Transport Protocol;" Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings, MILCOM 2000; vol. 2; Oct. 2002; 6 pages.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communcation Costs;" IEEE Forty-Ninth Annual Allerton Conference—Allerton House; Sep. 28-30, 2011; pp. 1358-1365.
Awerbuch, et al.; "On-Line Generalized Steiner Problem;" Proceedings of the $7^{th}$ Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Berman, et al.; "Improved Approximations for the Steiner Tree Problem;" Journal of Algorithms; Chapter 39; pp. 325-334, 1994.
Bhadra, et al.; "Looking at Large Networks: Coding vs. Queuing;" Proc. of the $25^{th}$ IEEE International Conference on Computer Communications (INFOCOM); Apr. 2006; 12 pages.
Bhargava, et al.; "Forward Error Correction Coding;" Mobile Communications Handbook; Part 1: Basic Principals; 1999; 18 pages.
Birk, et al.; "Judicious Use of Redundant Transmissions in Multichannel ALOHA Networks with Deadlines;" IEEE Journal on Selected Areas in Communications; vol. 17; No. 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Springer; Mobile Networks and Applications; Feb. 2009; pp. 4-17.
Borokhovich, et al.; "Tight bounds for Algebraic Gossip on Graphs;" Proc. of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al; "Minimum Entropy Combinatorial Optimization Problems;" Data Structure and Algorithms, Discrete Mathematics; Aug. 17, 2010; pp. 1-16.
Castro, et al.; "Upper and Lower Error Bounds for Active Learning;" The 44'th Annual Allerton Conference on Communication, Control and Computing; vol. 2, No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Multipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" $7^{th}$ ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the $5^{th}$ International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the $9^{th}$ ACM-SIAM Symposium on Discrete Algorithms, pp. 1-15; 1998.
Chen, et al.; "Pipeline Network Coding for Multicast Streams;" ICMU Org.; 2010; 7 pages.
Chou, et al.; "FEC and Pseudo-ARQ for Receiver-driven Layered Multicast of Audio and Video;" Data Compression Conference (DCC), 2000; Proceedings; Jan. 2000; 10 pages.
Chou, et al.; "Practical Network Coding;" Proceedings of the $41^{st}$ Annual Allerton Conference on Communication, Control, and Computing; Oct. 2003; 10 pages.
Cisco Visual Networking Index: Forecast and Methodology; 2009-2014; White Paper; Jun. 2, 2010; pp. 1-17.
Cloud, et al.; "Co-Designing Multi-Packet Reception, Network Coding, and MAC Using a Simple Predictive Model;" arXiv:1101.5779v1 [cs.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless@mit—MIT Center for Wireless Networks and Mobile Computing; 2012 Inaugural Retreat; Oct. 10-11, 2012.
Cloud, et al; U.S. Appl. No. 13/654,953, filed Oct. 18, 2012.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.

(56) References Cited

OTHER PUBLICATIONS

Deb, et al.; "Algebraic Gossip: A Network Coding Approach to Optimal Multiple Rumor Mongering;" Proc. of the $42^{nd}$ Allerton Conference on Communication, Control, and Computing; Jan. 2004; 10 pages.

Deb, et al.; "On Random Network Coding Based Information Dissemination;" Proc. of the IEEE International Symposium on Information Theory (ISIT); Sep. 4-9, 2005; 5 pages.

Dias, et al.; "Performance Analysis of HARQ in WiMax Networks Considering Imperfect Channel Estimation;" The $7^{th}$ International Telecommunications Symposium (ITS 2010); 2010; 5 pages.

Dimakis, et al.; "A Survey on Network Codes for Distributed Storage;" Proceedings of the IEEE; vol. 99; No. 3; Mar. 2011; pp. 476-489.

Dimakis, et al.; "Network Coding for Distributed Storage Systems;" IEEE/ACM Transactions on Information Theory; vol. 56; No. 9; pp. 1-13 2008.

Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.

Effros; Distortion-Rate Bounds for Fixed- and Variable-Rate Multiresolution Source Codes; IEEE Transactions on Information Theory; vol. 45, No. 6; Sep. 1999; pp. 1887-1910.

Effros; "Universal Multiresolution Source Codes;" IEEE Transactions on Information Theory; vol. 47; No. 6; Sep. 2001; pp. 2113-2129.

El Bahri, et al.; "Performance Comparison of Type I, II and III Hybrid ARQ Schemes over AWGN Channels;" 2004 IEEE International Conference on Industrial Technology (ICIT); vol. 3; Dec. 8-10, 2004; pp. 1417-1421.

Eryilmaz, et al.; On Delay Performance Gains From Network Coding; Information Sciences and Systems; 2006 $40^{th}$ Annual Conference on Mar. 22-24, 2006; 7 pages.

Fan, et al.; "Reliable Relay Assisted Wireless Multicast Using Network Coding;" IEEE Journal on Selected Areas in communications; vol. 27; No. 5; Jun. 2009; pp. 749-762.

Feizi, et al.; "Locally Adaptive Sampling;" Communication, Control, and Computing; 2010; $48^{th}$ Annual Allerton Conference, IEEE; Sep. 29, 2010; pp. 152-159.

Feizi, et al.; "On Network Functional Compression;" arXiv online repository; URL: http://arxiv.org/pdf/1011.5496v2.pdf; Nov. 30, 2010p pp. 1-60.

Feizi, et al.; "When Do Only Sources Need to Compute? On Functional Compression in Tree Networks;" $47^{th}$ Annual Allerton Conference, IEEE; Sep. 30, 2009; pp. 447-454.

Feizi, et al; "Cases Where Finding a Minimum Entropy Coloring of a Characteristic Graph is a Polynomial Time Problem;" IEEE International Symposium on Information Theory; Jun. 13, 2010; pp. 116-120.

Ferner, et al.; "Toward Sustainable Networking: Storage Area Networks with Network Coding;" Fiftieth Annual Allerton Conference; IEEE; Oct. 1-5, 2012; pp. 517-524.

Ford; "Architectural Guidelines for Multipath TCP Development;" Internet Engineering Task Force; Internet-Draft; Dec. 8, 2010; 17 pages.

Ford; "TCP Extension for Multipath Operation with Multiple Addresses draft-ford-mptcp-multiaddressed-03;" Internet Engineering Task Force; Internet-Draft; Mar. 8, 2010; 35 pages.

Fragouli, et al.; "Wireless Network Coding: Opportunities & Challenges;" MILCOM; Oct. 2007; 8 pages.

Frossard, et al.; "Media Streaming With Network Diversity;" Invited Paper; Proceedings of the IEEE; vol. 96, No. 1; Jan. 2008; pp. 39-53.

Galbraith, et al.; (HGST); "Iterative Detection Read Channel Technology in Hard Disk Drives;" Whitepaper; Nov. 2008; 8 pages.

Garcia-Luna-Aceves; "Challenges: Towards Truly Scalable Ad Hoc Networks;" MobiCom 2007; Sep. 2007; pp. 207-214.

Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.

Ghaderi, et al.; Reliability Gain of Network Coding in Lossy Wireless Networks; Infocom 2008; The $27^{th}$ Conference on Computer Communications IEEE; Apr. 13-18, 2008; 5 pages.

Gheorghiu, et al.; " Multipath TCP with Network Coding for Wireless Mesh Networks;" IEEE Communications (ICC) 2010 International Conference; May 23-27, 2010; 5 pages.

Gheorghiu, et al.; "On the Performance of Network Coding in Multi-Resolution Wireless Video Streaming;" IEEE International Symposium on Jun. 9-11, 2010; 6 pages.

Ghez, et al.; "Stability Properties of Slotted Aloha with Multipacket Reception Capability;" IEEE Transactions on Automatic Control; vol. 33; No. 7; Jul. 1988; pp. 640-649.

Gkantsidis, et al.; "Cooperative Security for Network Coding File Distribution;" Proc. IEEE Infocom; Apr. 2006; 13 pages.

Gollakota, et al.; "ZigZag Decoding: Combating Hidden Terminals in Wireless Networks;" SIGCOMM 08; Aug. 17-22; pp. 159-170.

Golrezaei, et al.; "FemtoCaching: Wireless Video Content Delivery Through Distributed Caching Helpers;" arXiv:1109.4179v2; Apr. 7, 2012; pp. 1-11.

Grant, et al.; "Graph Implementation for Nonsmooth Convex Programs;" LNCIS 371; Springer-Verlag Limited; Jan. 2008; pp. 95-110.

Gupta; "The Capacity of Wireless Networks;" IEEE Transactions on Information Theory; vol. 46; No. 2; Mar. 2000; pp. 388-404.

Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.

Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.

Haeupler; "Analyzing Network Coding Gossip Made Easy;" Proc. of the $43^{rd}$ Symposium on Theory of Computing (STOC); Jan. 2011, 13 pages.

Haeupler, et al.; "Optimality of Network Coding in Packet Networks;" ArXiv, Feb. 17, 2011; 5 pages.

Haley, et. al.; "Reversible Low-Density Parity-Check Codes;" IEEE Transactions on Information Theory; vol. 55; No. 5; May 2009; pp. 2016-2036.

Han, et al.; "Multi-Path TCP: A Joint Congestion Control and Routing Scheme to Exploit Path Diversity in the Internet;" IEEE/ACM Transactions on Networking (TON); vol. 14; No. 6, Dec. 2006; 26 pages.

Hassner, et al.; "4K Bye-Sector HDD-Data Format Standard;" Windows Hardware and Driver Central; San Jose, CA; Aug. 14, 2013; 5 pages.

Ho, et al.; "Byzantine Modification Detection in Multicast Networks using Randomized Network Coding;" IEEE; ISIT; Jun. 27-Jul. 2, 2004; p. 144.

Ho, et al.; "Network Coding from a Network Flow Perspective;" ISIT; Jun.-Jul. 2003; 6 pages.

Ho, et al.; "On Randomized Network Coding;" Proceedings of $41^{st}$ Annual Allerton Conference on Communications, Control and Computing; Oct. 2003; 10 pages.

Ho, et al.; "On the utility of network coding in dynamic environments;" International Workshop on Wireless Ad-Hoc Networks (IWWAN); 2004; pp. 1-5.

Ho, et al.; "The Benefits of Coding over Routing in a Randomized Setting;" Proceedings of 2003 IEEE International Symposium on Information Theory; Jun. 2003; pp. 1-6.

Hofri; "Disk Scheduling: FCFS vs. SSTF Revisited;" Communications of the ACM; vol. 23; No. 11; Nov. 1980; pp. 645-653.

Hong, et al.; Network-coding-based hybrid ARQ scheme for mobile relay networks; Electronics Letters; vol. 46; No. 7; Apr. 1, 2010; 2 pages.

International Disk Drive Equipment and Materials Assoc.; "Advanced Standard;" in Windows Hardware Engineering Conf.; May 2005; 11 pages.

Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.

(56) References Cited

OTHER PUBLICATIONS

Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.

Jaggi, et al.; "Low Complexity Algebraic Multicast Network Codes;" Proceedings of the IEEE International Symposium on Information Theory; Jul. 4, 2003; 1 page.

Jaggi, et al.; "Resilient Network Coding in the Presence of Byzantine Adversaries;" Proc. IEEE INFOCOM; May 2007; 9 pages.

Jakubczak, et al.; "One-Size-Fits-All Wireless Video;" ACM SigComm Hotnets 2009; 6 pages.

Jamieson, et al.; "PPR: Partial Packet Recovery for Wireless Networks;" SIGCOMM 07; Aug. 27-31, 2007; 12 pages.

Jamieson, et al.; "PPR: Partial Packet Recovery for Wireless Networks;" Presentation; SIGCOMM 07; Aug. 27-31, 2007; 25 pages.

Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.

Ji, et. al; "A network coding based hybrid ARQ algorithm for wireless video broadcast;" Science China; Information Sciences; vol. 54; No. 6; Jun. 2011; pp. 1327-1332.

Jin, et al.; "Adaptive Random Network Coding in WiMAX;" Communications, 2008; ICC'08 IEEE International Conference on May 19-23, 2008; 5 pages.

Jin, et al.; "Is Random Network Coding Helpful in WiMax;" IEEE 27th Conference on Computer Communications; Apr. 2008; 5 pages.

Jolfaei, et al.; "A New Efficient Selective Repeat Protocol for Point-To_Multipoint Communication;" Communications 1993; ICC'93 Genova Technical Program, Conference Record; IEEE International Conference on May 23-26, 1993; vol. 2; pp. 1113-1117.

Karkpinski, et al.; "New Approximation Algorithms for the Steiner Tree Problems;" Technical Report, Electronic Colloquium on Computational Complexity (ECCC) TR95-030; 1995; pp. 1-17.

Katti, et al.; "XORs in the Air: Practical Wireless Network Coding;" IEEE/ACM Transactions on Networking; vol. 16; No. 3; 2008; pp. 1-14.

Katti, et al.; "XORs in the Air: Practical Wireless Network Coding;" ACM SIGCOMM '06; Computer Communications Review; vol. 36; Sep. 11-15, 2006; 12 pages.

Key, et al.; "Combining Multipath Routing and Congestion Control for Robustness;" In Proceedings of IEEE CISS, 2006, 6 pages.

Kim, et al.; "Modeling Network Coded TCP Throughout: A Simple Model and its Validation;" VALUETOOLS '11 Proceedings of the 5th International ICST Conference on Performance Evaluation Methodologies and Tools; May 16-20, 2011; 10 pages.

Kim, et al.; "Modeling Network Coded TCP Throughput: A Simple Model and its Validation", Cornell University Library, http://arxiv.org/abs/1008.0420, Aug. 2010, 3 pages.

Kim, et al.; "Network Coding for Multi-Resolution Multicast;" IEEE INFOCOM 2010; Mar. 2010; 9 pages.

Kim, et al.; "Transform-free analysis of the GI/G/1/K queue through the decomposed Little's formula;" Computers and Operations Research; vol. 30; No. 3; Mar. 2003; pp. 1-20.

Kim, et. al.; "Modeling Network Coded TCP Throughput: A Simple Model and its Validation", arXiv: 1008.0420v1 [cs.IT] Aug. 2, 2010; 9 pages.

Kim, et. al.; "Modeling Network Coded TCP Throughput: A Simple Model and its Validation", Nov. 2010, Presentation; 19 pages.

Kodialam, et al.; "Online Multicast Routing With Bandwidth Guarantees: A New Approach Using Multicast Network Flow;" IEEE/ACM Transactions on Networking; vol. 11; No. 4; Aug. 2003; pp. 676-686.

Koetter, et al.; "Beyond Routing: An Algebraic Approach to Network Coding;" IEEE Infocom; 2002; 9 pages.

Koutsonikolas, et al.; "Efficient Online WiFi Delivery of Layered-Coding Media using Inter-layer Network Coding;" Distributed Computing Systems (ICDCS); 2011 31st International Conference on Jun. 2011; 11 pages.

Kuhn, et al.; "Distributed Computation in Dynamic Networks;" Proc. of the 42rd Symposium on Theory of Computing (STOC); Jun. 5-8, 2010; 10 pages.

Lai; "Sequential Analysis: Some Classical Problems and New Challenges"; Statistica Sinica, vol. 11, No. 2; 2001; pp. 303-350.

Landau; "Application of the Volterra Series to the Analysis and Design of an Angle Track Loop;" IEEE Transactions on Aerospace and Electronic Systems; vol. AES-8, No. 3; May 1972; pp. 306-318.

Larsson, et al.; "Analysis of Network Coded HARQ for Multiple Unicast Flows;" Communication (ICC) 2010 IEEE International Conference on May 23-27, 2010 pp. 1-6.

Larsson, et al.; "Multi-User ARQ;" Vehicular Technology Conference; 2006; VTC (2006—Spring); IEEE 63rd; vol. 4; May 7-10, 2006; pp. 2052-2057.

Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.

Larsson; "Multicast Multiuser ARQ;" Wireless Communications and Networking Conference (WCNC) 2008; IEEE; Apr. 3, 2008; pp. 1985-1990.

Le, et al.; "How Many Packets Can We Encode?—An Analysis of Practical Wireless Network Coding;" INFOCOM 2008: The 27th Conference on Computer Communications, IEEE; 2008; pp. 1040-1048.

Lee, et al.; "Content Distribution in VANETs using Network Coding: The Effect of Disk I/O and Processing O/H;" Proc. IEEE SECON; Jan. 2008; pp. 117-125.

Lehman, et al; "Complexity Classification of Network Information Flow Problems;" SODA 04 Proceedings of the fifteenth annual ACM-SIAM symposium on Discrete algorithms; Jan. 2004; pp. 9-10.

Li, et al.; "N-in-1 Retransmission with Network Coding;" IEEE Transactions on Wireless Communications; vol. 9; No. 9; Sep. 2010; pp. 2689-2694.

Li,et al.; "Linear Network Coding;" IEEE Transactions on Information Theory; vol. 49; No. 2; Feb. 2003; pp. 371-381.

Lima, et al.; "An Information-Theoretic Cryptanalysis of Network Coding—is Protecting the Code Enough;" International Symposium on Information Theory and its Applications; Dec. 2008; 6 pages.

Liu, et al.; "The Throughput Order of Ad Hoc Networks Employing Network Coding and Broadcasting;" Military Communications Conference; MILCOM 2006; Oct. 2006; pp. 1-7.

Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.

Luby, et al.; "The Use of Forward Error Correction (FEC) in Reliable Multicast;" Internet Society Request for Comments; RFC 3453; Dec. 2002; 18 pages.

Lucani et al.; "On Coding for Delay New Approaches based on Network Coding in Network Coding in Networks with Large Latency;" Presentation in NetCod; Slide Presentation; Jun. 16, 2009; 17 pages.

Lucani et al; "Broadcasting in Time-Division Duplexing: A Random Linear Network Coding Approach;" presented Switzerland; Conference: NetCod 2009, Lausanne, Switzerland; Jun. 2009; 6 pages.

Lucani et al; "On Coding for Delay—New Approaches Based on Network Coding in Networks with Large Latency;" Conference: ITA Workshop, San Diego, USA; Feb. 2009; 10 pages.

Lucani et al; "On Coding for Delay New Approaches based on Network Coding in Networks with Large Latency;" Conference ITA Workshop, San Diego, USA; Slide Presentation; Feb. 13, 2009; 11 pages.

Lucani et al; "Random Linear Network Coding for Time Division Duplexing: Energy Analysis;" Conference: ICC 2009, Dresden, Germany; Jun. 2009; 5 pages.

Lucani et al; "Random Linear Network Coding for Time-Division Duplexing: when to stop talking and start listening;" Presentation in ICC; Slide Presentation; Jun. 16, 2009; 6 pages.

Lucani et al; "Random Linear Network Coding for Time-Division Duplexing: when to stop talking and start listening;" Presentation in INFOCOM; Slide Presentation; Apr. 23, 2009; 10 pages.

(56) References Cited

OTHER PUBLICATIONS

Lucani et al; "Random Linear Network Coding for Time-Division Duplexing: Queueing Analysis;" Conference ISIT 2009, Seoul, Korea; Jul. 2009; 5 pages.

Lucani et al; "Random Linear Network Coding for Time-Division Duplexing: Field Size Considerations;" Conference: GLOBECOM 2009, Hawaii, USA; Dec. 2009; 6 pages.

Lucani, et al.; "Network Coding for Data Dissemination: It Is Not What You Know, But What Your Neighbors Don't Know;" Modeling and Optimization in Mobile, AdHoc, and Wireless Networks 2009; WiOPT 2009; $7^{th}$ International Symposium on Jun. 23-27, 2009; pp. 1-8.

Lucani, et al.; "Network Coding Schemes for Underwater Networks;" WUWNet 07; Sep. 14, 2007; pp. 25-32.

Lucani, et al.; Systematic Network Coding for Time-Division Duplexing; Proceedings of the IEEE International Symposium on Information Theory (ISIT); ; Jun. 13-18, 2010; pp. 2403-2407.

Lun, et al.; "Further Results on Coding for Reliable Communication over Packet Networks;" Information Theory, ISIT 2005 Proceedings International Symposium on Sep. 4-9, 2005; 5 pages.

Lun, et al.; "On Coding for Reliable Communication Over Packet Networks;" Physical Communication; vol. 1; No. 1; Jan. 2008; pp. 10 pages.

Lun, et al.; "On Coding for Reliable Communication over Packet Networks;" LIDS Publication #2741; Jan. 2007; 33 pages.

Lun, et al.; An Analysis of Finite-Memory Random Linear Coding on Packet Streams; Modeling and Optimization in Mobile, Ad Hoc and Wireless Networks; Apr. 3-6, 2006; pp. 1-6.

Lun; "Efficient Operation of Coded Packet Networks;" Ph.D. Dissertation; Massachusetts Institute of Technology; Jun. 2006; 130 pages.

Mallat, et al.; "Adaptive Covariance Estimation of Locally Stationary Processes;" Annals of Statistics, vol. 26, No. 1; 1998; pp. 1-43.

Manssour, et al.; "A Unicast Retransmission Scheme based on Network Coding;" IEEE Transactions on Vehicular Technology; vol. 61; Issue 2; Nov. 2011; 7 pages.

Maymounkov, et al.; "Methods for Efficient Network Coding;" Proc. of the $44^{th}$ Allerton Conference on Communication, Control, and Computing; Sep. 2006; 10 pages.

Médard, et al.; "On Coding for Non-Multicast Networks;" invited paper, $41^{st}$ Allerton Annual Conference on Communication, Control; Outgrowth of supervised student research Publications of Muriel Medard and Computing; vol. 1; Oct. 2003; 9 pages.

Medard; "Some New Directions for Network Coding in Content Distribution", RLE, EECS, MIT, Seminar to Alcatel Lucent, Nov. 2010, 29 pages.

Merchant, et al.; "Analytic Modeling of Clustered RAID with Mapping Based on Nearly Random Permutation;" IEEE Transactions on Computers; vol. 45; No. 3; Mar. 1996; pp. 367-373.

Metzner; "An Improved Broadcast Retransmission Protocol;" IEEE Transactions on Communications; vol. COM-32; No. 6; Jun. 1984; pp. 679-683.

Mosk-Aoyama, et al.; "Information Dissemination via Network Coding;" ISIT 2006; IEEE; Jul. 9-14, 2006; pp. 1748-1752.

Nguyen, et al.; "Internet Media Streaming Using Network Coding and Path Diversity;" IEEE Global Telecommunications Conference; Nov. 30-Dec. 4, 2008; 5 pages.

Nguyen, et al.; "Wireless Broadcast Using Network Coding;" Vehicular Technology IEEE Transactions on Feb. 2009; vol. 58; Issue 2; 25 pages.

Nguyen, et al; "Video Streaming with Network Coding;" Journal of Signal Processing Systems; vol. 59, Issue 3; DOI: 10.1007/s11265-009-0342-7; Jun. 2010; 25 pages.

Nobel; "Hypothesis Testing for Families of Ergodic Processes;" Bernoulli-London, vol. 12, No. 2; 2006; 21 pages.

Noguichi, et al.; "Performance Evaluation of New Multicast Architecture with Network Coding;" IEICE Transactions on Communication, E86-B; No. 6; Jun. 2003; 3 pages.

NS Version 1—LBNL Network Simulator; web page—http://ee.lel.gov/ns/; Mar. 21, 2011; 3 pages.

Nyandoro, et al.; "Service Differentiation in Wireless LANs based on Capture;" IEEE GLOBECOM 2005; vol. 6; Dec. 2005; 5 pages.

ParandehGheibi, et al.; "Access-Network Association Policies for Media Streaming in Heterogeneous Environments;" Apr. 2010; pp. 1-8.

Peng, et al.; "Research on Network Coding based Hybrid-ARQ Scheme for Wireless Networks;" Communication Systems (ICCS); 2010 IEEE International Conference on Nov. 17-19, 2010; pp. 218-222.

Popovici, et al.; "Robust, Portable I/O Scheduling with the Disk Mimic;" Proc. USENIX Annual Tech. Conf. San Antonio, Texas, Jun. 2003; 14 pages.

Qureshi, et al.; "An Efficient Network Coding based Retransmission Algorithm for Wireless Multicast;" Personal, Indoor and Mobile Radio Communications, 2009 IEEE $20^{th}$ International Symposium on Sep. 13-16, 2009; 5 pages.

Radunovic, et al.; "Horizon: Balancing TCP Over Multiple Paths in Wireless Mesh Network;" Proc. $14^{th}$ ACM International Conference on Mobile Computing and Networking; Sep. 2008; 12 pages.

Ramanathan; "Multicast Tree Generation in Networks with Asymmetric Links;" IEEE Transactions on Networking; vol. 4; Aug. 1996; pp. 1-12.

Rezaee, et al.; " Multi Packet Reception and Network Coding;" Presentation at The 2010 Military Communications Conference Unclassified Technical Program; Nov. 2, 2010; 15 pages.

Rezaee, et al.; "An Analysis of Speeding Multicast by Acknowledgment Reduction Technique (SMART) with Homogeneous and Heterogeneous Links—A Method of Types Approach;" Signals, Systems and Computers (ASILOMAR) 2011 Conference; IEEE; Nov. 2011; pp. 21-27.

Rezaee, et al.; "Speeding Multicast by Acknowledgment Reduction Technique (SMART);" ArXiv:1104.2941v2 [cs.NI] Sep. 10, 2011; 6 pages.

Rezaee, et al.; "Speeding Multicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.

Rezaee, et.al.; "Multi Packet Reception and Network Coding;" Military Communications Conference; 2010; MILCOM 2010; IEEE; Oct. 31, 2010-Nov. 3, 2010; pp. 1393-1398.

Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.

Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.

Ruemmler, et al.; "An introduction to disk drive modeling;" IEEE Computers; vol. 27; No. 3; Mar. 17-29, 1994; 17 pages.

Ryabko, et al.; "On Hypotheses Testing for Ergodic Processes;" Information Theory Workshop; ITW'08; IEEE; 2008; pp. 281-283.

Sanders, et al.; "Polynomial Time Algorithms for Network Information Flow;" $15^{th}$ ACM Symposium on Parallel Algorithms and Architectures; Jun. 2003; pp. 1-9.

Sayenko, et al.; "Performance Analysis of the IEEE 802.16 ARQ Mechanism;" MSWiM'07; Oct. 22-26, 2007; pp. 314-322.

Scharf; "MPTCP Application Interface Considerations draft-scharf-mptcp-ap-04;" Internet Engineering Task Force; Internet-Draft; Nov. 22, 2010; 26 pages.

Seferoglu, et al.; "Opportunistic Network Coding for Video Streaming over Wireless;" Packet Video; Nov. 2007; 10 pages.

Sengupta, et al.; "An Analysis of Wireless Network Coding for Unicast Sessions: The Case for Coding-Aware Routing;" in INFOCOM 2007; $26^{th}$ IEEE International Conference on Computer Communications; Jun. 2007; 9 pages.

Servetto, et al.; "Constrained Random Walks on Random Graphs: Routing Algorithms for Large Scale Wireless Sensor Networks;" WSNA 02; Sep. 28, 2002; 10 pages.

Shields; "The Interactions Between Ergodic Theory and Information Theory;" IEEE Transactions on Information Theory, vol. 44, No. 6; Oct. 1998; pp. 2079-2093.

(56) References Cited

OTHER PUBLICATIONS

Shrader, et al.; "Systematic wireless network coding;" Military Conference, 2009; MILCOM 2009; IEEE; 7 pages.
Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.
Shriver, et al.; "An analytic behavior model for disk drives with readahead caches and request reordering;" Proc. SIGMETRICS/Performance, Joint Conf. on Meas. and Modeling Comp. Sys.; ACM; Jan. 1998; 10 pages.
SongPu, et al.; Performance analysis of joint chase combining and network coding in wireless broadcast retransmission; Wireless Communication, Network and Mobile Computing 2008; WiCOM '08, $4^{th}$ International Conference on Oct. 12-14, 2008; pp. 1-4.
Soo Suh; "Send-On-Delta Sensor Data Transmission With a Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. $43^{rd}$ Allerton Conference on Communication, Control, and Computing; Sep. 2005; 7 pages.
Sundararajan, et al.; "ARQ for Network Coding;" ISIT Proc. of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99, Issue 3; Mar. 2011; pp. 490-512.
Sundararajan, et al.; "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; $7^{th}$ International ITG Conference on Jan. 14-16, 2008; 6 pages.
Tran, et al.; "A Hybrid Network Coding Technique for Single-Hop Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Tsatsanis, et al.; "Network Assisted Diversity for Random Access Wireless Data Networks;" Signals, Systems & amp; Computers; IEEE; vol. 1; Nov. 1-4, 1988; pp. 83-87.
Valancius, et al.; "Greening the Internet with Nano Data Centers;" Proc. $5^{th}$ International Conference on Emerging Networking Experiments and Technologies; CoNEXT 2009; ACM 2009; Dec. 1-4, 2009; pp. 37-48.
Vasudevan, et al.; "Algebraic Gossip on Arbitrary Networks;" arXiv:0901.1444; Jan. 2009; 5 pages.
Velambi, et al.; "Throughput and Latency in Finite-Buffer Line Networks;" IEEE Transactions on Information Theory; vol. 57; No. 6; Jun. 2011; pp. 3622-3643.

Vien, al.; "Network Coding-based Block ACK for Wireless Relay Networks;" Proceedings of IEEE Vehicular Technology Conference (VTC2011—Spring); May 2011; 5 pages.
Vien, et al.; "Network Coding-based ARQ Retransmission Strategies for Two-Way Wireless Relay Networks;" Software, Telecommunications and Computer Networks (SoftCOM) 2010; International Conference on Sep. 23-25, 2010; 5 pages.
Vilela, et al.; "Lightweight Security for Network Coding;" IEEE International Conference on Communications; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Interference in Ad Hoc Networks Using Joint Routing and Scheduling with Multiple Packet Reception;" in INFOCOM 2008; The $27^{th}$ Conference on Computer Communications; IEEE; Apr. 2008; pp. 1517-1525.
Wang, et al.; Multipath Live Streaming via TCP: Scheme, Performance and Benefits; ACM Transactions on Multimedia Computing, Communications and Applications; vol. 5; No. 3; Article 25; Aug. 2009; pp. 1-23.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
Wu, et al.; "A Trellis Connectivity Analysis of Random Linear Network Coding with Buffering;" Proc. of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yong, et al.; "XOR Retransmission in Multicast Error Recovery;" Networks 2000; ICON; Proceedings IEEE International Conference on Sep. 5-8, 2000; pp. 336-340.
Yun, et al.; "High-Throughput Random Access Using Successive Interference Cancellation in a Tree Algorithm;" IEEE Transactions on Information Theory; vol. 53; No. 12; Dec. 2007; pp. 4628-4639.
Yun, et al.; Towards Zero Retransmission Overhead: A Symbol Level Network Coding Approach to Retransmission; IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zhang, et al.; "Collision Resolution in Packet Radio Networks Using Rotational Invariance Techniques;" IEEE Transactions on Communication; vol. 50; No. 1; Jan. 2002; pp. 146-155.
Zhang, et al.; "Optimized Multipath Network Coding in Loss Wireless Networks;" ICDCS '08 Proceedings of the 2008 The $28^{th}$ International Conference on Distributing Computing Systems; Jan. 2008; 12 pages.
Zhang, et al.; Dual XOR in the AIR: A Network Coding Based Retransmission Scheme for Wireless Broadcasting; Communications (ICC) 2011 IEEE International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
U.S. Appl. No. 13/071,674, filed Mar. 25, 2011.
U.S. Appl. No. 13/836,981, filed Mar. 15, 2013.
U.S. Appl. No. 14/843,358, filed Sep. 2, 2015, Haupler, et al.
U.S. Appl. No. 14/826,256, filed Aug. 14, 2015, Zeger, et al.

* cited by examiner

SECURE NETWORK CODING FOR MULTI-RESOLUTION WIRELESS TRANSMISSION

CROSS REFERENCE TO RELATED APPLICATIONS

This application is a continuation of U.S. patent application Ser. No. 13/836,981 filed on Mar. 15, 2013 now U.S. Pat. No. 9,137,492 issued on Sep. 15, 2015, which is a continuation of U.S. patent application Ser. No. 13/071,674 filed on Mar. 25, 2011 now U.S. Pat. No. 8,571,214 issued on Oct. 29, 2013, which claims the benefit, under 35 U.S.C. § 119(e), of Provisional application No. 61/317,532 filed Mar. 25, 2010 which applications are hereby incorporated herein by reference in their entireties.

STATEMENT REGARDING FEDERALLY SPONSORED RESEARCH

This invention was made with government support under Grant No. FA9550-06-1-0155 awarded by the U.S. Air Force and under Contract No. N66001-08-C-2013 awarded by the Space and Naval Warfare Systems Command. The government has certain rights to this invention.

FIELD OF THE INVENTION

The concepts described herein generally relate to network coding schemes and more particularly to secure network coding for multi-resolution wireless video streaming.

BACKGROUND OF THE INVENTION

As is known in the art, there has been abundant research aiming at ensuring a reasonable quality of video experience for wireless users.

As is also known, the task of providing video streaming of variable quality to a heterogeneous set of receivers with different subscription levels is still an open issue. One challenge is to serve wireless users with video streams that: (i) are of different quality, depending on subscription level; and (ii) provide security guarantees to ensure that only authorized users will access the protected video streams.

In order to illustrate this problem, one can consider the scenario illustrated in FIG. 1, in which nodes A, B and C are interested in a video stream served by node S, but they have paid for different video qualities, for example different layers of a multi-resolution video stream. Node S can connect to the receivers through three relay nodes R1, R2, R3 in wireless range, but with poor channel quality. Due at least in part to the noisy nature of the wireless medium, at least some packets transmitted by node S are lost. Reliable video transmission, however, requires node S to retransmit the lost packets using feedback received from nodes A, B and C. Moreover, relays R1, R2, R3 need to synchronize and schedule transmissions to ensure that each node A, B, C receives all packets without duplicates. Under this scenario, video quality can decrease, because some video frames are not delivered in a timely fashion and are therefore skipped.

Moreover, given the broadcast property of the wireless medium, nodes that did not have subscription access to certain layers can potentially overhear the transmitted packets. In FIG. 1, for example, node B could overhear layer 3 frames. Preventing unauthorized access to certain layers in the presence of relay nodes thus imposes a challenging security problem, in particular because encryption of the complete video stream is often deemed unfeasible in resource-limited mobile terminals.

Furthermore, real time decoding of high-quality video already consumes a great deal of processing power, and can become overwhelming in conjunction with resources required for the decryption of large files. Moreover, a lossy wireless medium imposes additional requirements to the security mechanisms, such as robustness to losses and limited synchronization to prevent scheduling problems.

To reduce the amount of processing power required, one can reduce the complexity of the decoding by partially encrypting the video data. However, it is relatively difficult to evaluate the degree of security provided by partial encrypting schemes. The use of layered coding in wireless scenarios was seen as promising, but it is likely to yield prioritization and scheduling problems. For instance, some prior art work has shown that even a relatively simple prioritization of a base layer is not a trivial task.

SUMMARY OF THE INVENTION

In order to address the above and other problems, a technique known as network coding can be used. The network coding approach allows nodes in a network to combine different information flows by means of algebraic operations. This principle leads to an unconventional way of increasing throughput and robustness of highly volatile networks, such as wireless networks, sensor networks and peer-to-peer systems. Network coding is known to have benefits for wireless communications. It is also known that network coding can also reduce, or in some cases even minimize, decoding delay with feedback, making it suitable for multimedia streaming.

Described herein is a method and system for hierarchical wireless video with network coding which limits encryption operations to a predetermined set of network coding coefficients in combination with multi-resolution video coding. Such a method and system achieves hierarchical fidelity levels, robustness against wireless packet loss and efficient security by exploiting the algebraic structure of network coding.

Protection of a wireless video stream, while increasing the overall robustness to losses and failures, reducing scheduling problems and adding resilience, is also possible using network coding. By viewing the network code as a cipher, it is possible to create a lightweight cryptographic scheme that reduces the overall computational complexity. Thus, network coding inspires a reformulation of the typical separation between encryption and coding for error resilience.

It is unnecessary to perform security operations twice, since one can take advantage of the inherent security of this paradigm. As described herein, it is possible to take advantage of the above benefits of network coding to develop and analyze a novel secure network coding architecture for wireless video. Described herein is a multicast setting in which several devices, which are in general heterogeneous and have limited processing capabilities, subscribe to multi-resolution streaming video in a lossy wireless network.

Also described are security operations performed at the network coding layer which allow: (i) a reduction in the number of encryption operations while meeting the prescribed security guarantees, (ii) the resulting lightweight security scheme to be combined with efficient layered codes and streaming protocols for wireless video and (iii) matching network coding with scalable video streams, relying on network coding's asynchronous operation and inherent robustness to link failures and packet loss. Contributions described herein are as follows: (1) a secure scalable network coded method for video streaming designed for delay-sensitive applications that exploits the robustness of network coding with manageable complexity and quantifiable security levels; (2) demonstration of how hierarchical codes for scalable video based on successive refinement can be combined with network coding in scenarios where not all the nodes are authorized to receive the best quality; (3) analytical evaluation of the security properties of the novel scheme described herein, and discussion of performance and implementation in a wireless streaming service; (4) a description of insights and system considerations regarding implementation in real scenarios; and (5) preliminary proof-of-concept for a network coded video architecture in several wireless scenarios via simulation.

It has been found that by exploiting the algebraic structure of network coding, the triple goal of hierarchical fidelity levels, robustness against wireless packet loss and efficient security can be achieved and a secure scalable network coded method and system for video streaming designed for delay-sensitive applications that exploits the robustness of network coding with manageable complexity and quantifiable security levels is provided.

In accordance with the concepts, systems and techniques described herein, encryption operations are limited to a critical set of network coding coefficients provided by a source node in combination with multi-resolution video coding. The source node utilizes an n×n lower-triangular matrix A, in which n is the number of layers in a group of pictures (GoP). Matrix A is used for encoding at the source only and each non-zero entry of matrix A is an element $a_{ij}$ chosen uniformly at random from all non-zero elements of the field $F_q \setminus \{0\}$. The GoP is divided into a plurality of vectors $\underline{b}^{(1)} \ldots \underline{b}^{(w)}$, each of the vectors having K symbols $S_1$-$S_K$ in which the $k^{th}$ symbol of each vector belongs to a corresponding one of the n layers in the GoP and wherein the number of vectors created is computed as size of GoP/n. At least one symbol of each vector $\underline{b}^{(i)}$ is encrypted for each use of the encoding matrix wherein the output of the operation of a stream cypher is denoted as a symbol P with a random key $\underline{K}$ as E(P,$\underline{K}$). The encoding matrix A is successively applied to the information symbols to be sent to provide encoded information symbols which comprise a payload of one or more packets. Each of the one or more packets comprise a header and the payload and the header comprises locked and unlocked coefficients. Each line of a first matrix A is encrypted with a corresponding layer key wherein the first matrix A corresponds to a locked coefficients matrix. An n×n identity matrix corresponding to the unlocked coefficients is provided. The one or more packets are encoded in relay nodes in accordance with a random linear network coding (RLNC) protocol wherein algebraic coding is performed on unlocked coefficients, locked coefficients and the payload. The relay nodes identify the layer of a packet by looking at the first non-zero position in the unlocked coefficients, and packets are mixed with packets of the same or lower layers only.

In accordance with a further aspect of the concepts, systems and techniques described, a method for streaming video data in a network including a server node, a plurality of relay nodes and one or more receiver nodes, comprises performing a one-time key distribution between the source node and each of the one or more receiver nodes and dividing the video data into more than one group of pictures (GoP), each of the more than one group of pictures having a predetermined time of duration. For each group of pictures (GoP), generating at the source node an n×n lower-triangular matrix A, in which n is the number of layers in the GoP and using matrix A for encoding at the source only with each non-zero entry of matrix A being an element $a_{ij}$ chosen uniformly at random from all non-zero elements of the field $F_q \setminus \{0\}$. The method further includes dividing the GoP into a plurality of vectors $\underline{b}^{(1)} \ldots \underline{b}^{(w)}$, each of the vectors having K symbols $S_1$-$S_K$ in which the $k^{th}$ symbol of each vector belongs to a corresponding one of the n layers in the GoP and wherein the number of vectors created is computed as size of GoP/n. The method further comprises encrypting at least one symbol of each vector $\underline{b}^{(i)}$ for each use of the encoding matrix wherein the output of the operation of a stream cypher is denoted as a symbol P with a random key $\underline{K}$ as E(P,$\underline{K}$) and applying the encoding matrix A successively to the information symbols to be sent to provide encoded information symbols which comprise a payload of one or more packets with each of the one or more packets comprising a header and a payload. The method further comprises encrypting each line of a first matrix A with a corresponding layer key wherein the first matrix A corresponds to a locked coefficients matrix and generating an n×n identity matrix corresponding to the unlocked coefficients wherein the header of the packet comprises the locked and unlocked coefficients. The method further comprises encoding the one or more packets in relay nodes in accordance with a random linear network coding (RLNC) protocol wherein algebraic coding is performed on unlocked coefficients, locked coefficients and payload and the relay nodes identify the layer of a packet by looking at the first non-zero position in the unlocked coefficients, and packets are mixed with packets of the same or lower layers only.

In one embodiment, dividing the video data into more than one group of pictures (GoP), comprises dividing the video data into more than one GoPs having a time of duration of one (1) second.

In one embodiment, performing algebraic coding on unlocked coefficients, locked coefficients and the payload comprises performing algebraic coding indistinguishably on unlocked coefficients, locked coefficients and the payload.

In one embodiment, the method further comprises applying, via the receivers, Gaussian elimination following standard RLNC over the unlocked coefficients and recovering the locked coefficients by decrypting each line of the matrix with the corresponding key and obtaining plaintext by a substitution process.

In one embodiment, the protected symbols are encrypted with the key for the lowest level in the network such that all legitimate participants in the protocol can decrypt the locked symbols.

In one embodiment, the method further comprises sending a first line of the matrix unencrypted and starting the encryption of symbols at symbol 2 so that layer 1 is accessible by all nodes in the network.

In one embodiment, only a single key per layer is used for multi-resolution encryption and wherein the single key is shared among all receivers.

In one embodiment, encrypting comprises encrypting the base layer of the GoP in order to achieve maximum security.

In one embodiment, composing a payload of the packets includes forming the payload by concatenating all the vectors $A(E(b_1, \underline{K}), b_2, \ldots, b_x)^T$.

In one embodiment, encrypting each line of matrix A with a corresponding layer key comprises encrypting each line of matrix A with a corresponding layer key via the source.

In one embodiment, a packet from an nth layer corresponds to the nth line of matrix A such that that each packet of layer x includes packets from layers 1, ..., x−1, x.

In one embodiment, the method further comprises sending a first line of the matrix unencrypted and starting the encryption of symbols at symbol 2 so that layer 1 is accessible by all nodes in the network.

In one embodiment, when performing a linear combination of one packet of layer x with a packet of layer y>x, the resulting packet belongs to layer y.

In accordance with a still further aspect of the concepts, systems and techniques described herein a method of generating packets for transmission on a network comprises generating an n×n lower triangular matrix in which each non-zero element is chosen uniformly at random out of all non-zero elements of a finite field, dividing plaintext into vectors of elements wherein a first position of each vector is encrypted using a stream cipher and multiplying the matrix by each of the vectors to generate a payload.

In one embodiment, coefficients of the matrix are locked using one different key for each line of the matrix and placed in a header of the packets.

In one embodiment, the method further includes generating one line of an identity matrix for each line of the locked coefficients and sending the packets out to the network.

In one embodiment, generating an n×n lower triangular matrix comprises generating a 3×3 lower triangular matrix.

In one embodiment, dividing plaintext into vectors of elements comprises dividing plaintext into vectors of 3 elements.

In accordance with a further aspect of the concepts, systems and techniques described, a system for streaming video data in a network comprises a server node, a plurality of relay nodes and one or more receiver nodes.

With this particular arrangement, a secure scalable network coded system for streaming video data in a network including a server node, a plurality of relay nodes and one or more receiver nodes is provided.

Also described herein is a method and system for hierarchical wireless data transmission with network coding which limits encryption operations to a predetermined set of network coding coefficients in combination with multi-resolution data coding. Such a method and system achieves hierarchical fidelity levels, robustness against wireless packet loss and efficient security by exploiting the algebraic structure of network coding.

Protection of a wireless data stream, while increasing the overall robustness to losses and failures, reducing scheduling problems and adding resilience, is also possible using network coding. By viewing the network code as a cipher, it is possible to create a lightweight cryptographic scheme that reduces the overall computational complexity. Thus, network coding inspires a reformulation of the typical separation between encryption and coding for error resilience.

It is unnecessary to perform security operations twice, since one can take advantage of the inherent security of this paradigm. As described herein, it is possible to take advantage of the above benefits of network coding to develop and analyze a novel secure network coding architecture for wireless data including but not limited to video. Described herein is a multicast setting in which several devices, which are in general heterogeneous and have limited processing capabilities, subscribe to multi-resolution streaming data in a lossy wireless network.

Also described are security operations performed at the network coding layer which allow: (i) a reduction in the number of encryption operations while meeting the prescribed security guarantees, (ii) the resulting lightweight security scheme to be combined with efficient layered codes and streaming protocols for wireless data and (iii) matching network coding with scalable data streams, relying on network coding's asynchronous operation and inherent robustness to link failures and packet loss. Contributions described herein are as follows: (1) a secure scalable network coded method for data streaming designed for delay-sensitive applications that exploits the robustness of network coding with manageable complexity and quantifiable security levels; (2) demonstration of how hierarchical codes for scalable data based upon successive refinement can be combined with network coding in scenarios where not all the nodes are authorized to receive the best quality; (3) analytical evaluation of the security properties of the novel schemes described herein, and discussion of performance and implementation in a wireless streaming service; (4) a description of insights and system considerations regarding implementation in real scenarios; and (5) preliminary proof-of-concept for a network coded data architecture in several wireless scenarios via simulation.

It has been found that by exploiting the algebraic structure of network coding, the triple goal of hierarchical fidelity levels, robustness against wireless packet loss and efficient security can be achieved and a secure scalable network coded method and system for data streaming designed for delay-sensitive applications that exploits the robustness of network coding with manageable complexity and quantifiable security levels is provided.

In accordance with a still further aspect of the concepts, systems and techniques described herein a method and system for streaming data in a network including a server node, a plurality of relay nodes and one or more receiver nodes, includes performing a one-time key distribution between the source node and each of the one or more receiver nodes; dividing the data into more than one group, each of the more than one group having a predetermined time of duration; for each group, generating at the source node an n×n lower-triangular matrix A, in which n is the number of layers in the group wherein matrix A is used for encoding at the source only and each non-zero entry of matrix A is an element $a_{ij}$ chosen uniformly at random from all non-zero elements of the field $F_q \backslash \{0\}$; dividing the group into a plurality of vectors $\underline{b}^{(1)} \ldots \underline{b}^{(w)}$, each of the vectors having K symbols $S_1$-$S_K$ in which the $k^{th}$ symbol of each vector belongs to a corresponding one of the n layers in the group and wherein the number of vectors created is computed as size of group/n; encrypting at least one symbol of each vector $\underline{b}^{(i)}$ for each use of the encoding matrix wherein the output of the operation of a stream cypher is denoted as a symbol P with a random key $\underline{K}$ as E(P,$\underline{K}$); applying the encoding matrix A successively to the information symbols to be sent to provide encoded information symbols which comprise a payload of one or more packets; encrypting each line of a first matrix A with a corresponding layer key wherein the first matrix A corresponds to a locked coefficients matrix; generating an n×n identity matrix corresponding to the unlocked coefficients wherein each of the one or more packets comprise a header and the payload and wherein the header comprises the locked and unlocked coefficients; encoding the one or more packets in relay nodes in accordance with a random linear network coding (RLNC) protocol wherein algebraic coding is performed on unlocked coefficients, locked coefficients and payload; and the relay nodes identify the layer of a packet by looking at the first non-zero position in the unlocked coefficients, and packets are mixed with packets of the same or lower layers only.

In one embodiment, the time of duration is one second.

In one embodiment, performing algebraic coding on unlocked coefficients, locked coefficients and payload comprises performing algebraic coding indistinguishably on unlocked coefficients, locked coefficients and payload.

In one embodiment, the system and method further comprise: applying, via the receivers, Gaussian elimination over the unlocked coefficients; recovering the locked coefficients by decrypting each line of the matrix with the corresponding key; and obtaining plaintext by a substitution process.

In one embodiment, the protected symbols are encrypted with the key for the lowest level in the network such that all legitimate participants in the protocol can decrypt the locked symbols.

In one embodiment, the method and system further comprise: sending a first line of the matrix unencrypted; and starting the encryption of symbols at symbol 2 so that layer 1 is accessible by all nodes in the network.

In one embodiment, only a single key per layer is used for multi-resolution encryption and wherein the single key is shared among all receivers.

In one embodiment, encrypting comprises encrypting the base layer of the group in order to achieve maximum security.

In one embodiment, composing a payload of the packets includes forming the payload by concatenating all the vectors $A(E(b_1,\underline{K}), b_2, \ldots, b_x)^T$.

In one embodiment, encrypting each line of matrix A with a corresponding layer key comprises encrypting each line of matrix A with a corresponding layer key via the source.

In one embodiment, a packet from an nth layer corresponds to the nth line of matrix A such that that each packet of layer x includes packets from layers $1, \ldots, x-1, x$.

In one embodiment, the method and system further comprise: sending a first line of the matrix unencrypted; and starting the encryption of symbols at symbol 2 so that layer 1 is accessible by all nodes in the network.

In one embodiment, performing a linear combination of one packet of layer x with a packet of layer y>x, the resulting packet belongs to layer y.

In accordance with a still further aspect of the concepts, systems and techniques described herein a method and system for generating packets for transmission on a network, the method and system comprising: generating an n×n lower triangular matrix in which each non-zero element is chosen uniformly at random out of all non-zero elements of a finite field; dividing plaintext into vectors of elements wherein a first position of each vector is encrypted using a stream cipher; and multiplying the matrix by each of the vectors to generate a payload.

In one embodiment, coefficients of the matrix are locked using one different key for each line of the matrix and placed in a header of the packets.

In one embodiment, the method and system further comprise: generating one line of an identity matrix for each line of the locked coefficients; and sending the packets out to the network.

In one embodiment, generating an n×n lower triangular matrix comprises generating a 3×3 lower triangular matrix.

In one embodiment, dividing plaintext into vectors of elements comprises dividing plaintext into vectors of three elements.

A system and method for data streaming in a network, the method comprising (a) a server node for dividing data into more than one group, each of the more than one group having a predetermined time of duration wherein for each group, a source node generates an n×n lower-triangular matrix A, in which n is the number of layers in the group wherein matrix A is used for encoding at the source only and each non-zero entry of matrix A is an element $a_{ij}$ chosen uniformly at random from all non-zero elements of the field $F_q\setminus\{0\}$ and the source divides the group into a plurality of vectors $b^{(1)} \ldots b^{(w)}$, each of the vectors having K symbols $S_1$-$S_K$ in which the $k^{th}$ symbol of each vector belongs to a corresponding one of the n layers in the group and wherein the number of vectors created is computed as size of group/n and wherein the source node encrypts at least one symbol of each vector $\underline{b}^{(i)}$ for each use of the encoding matrix wherein the output of the operation of a stream cypher is denoted as a symbol P with a random key $\underline{K}$ as $E(P,\underline{K})$ and applies the encoding matrix A successively to the information symbols to be sent to provide encoded information symbols which comprise a payload of one or more packets and the source node encrypts each line of a first matrix A with a corresponding layer key wherein the first matrix A corresponds to a locked coefficients matrix and generates an n×n identity matrix corresponding to the unlocked coefficients wherein each of the one or more packets comprise a header and the payload; (b) a plurality of relay nodes; and (c) one or more receiver nodes wherein the header comprises the locked and unlocked coefficients and encodes the one or more packets in the relay nodes in accordance with a random linear network coding (RLNC) protocol wherein algebraic coding is performed on unlocked coefficients, locked coefficients and payload and the relay nodes identify the layer of a packet by looking at the first non-zero position in the unlocked coefficients, and packets are mixed with packets of the same or lower layers only.

BRIEF DESCRIPTION OF THE DRAWINGS

The foregoing features of this invention, as well as the invention itself, may be more fully understood from the following description of the drawings in which.

DETAILED DESCRIPTION OF THE PREFERRED EMBODIMENTS

Figure 1:
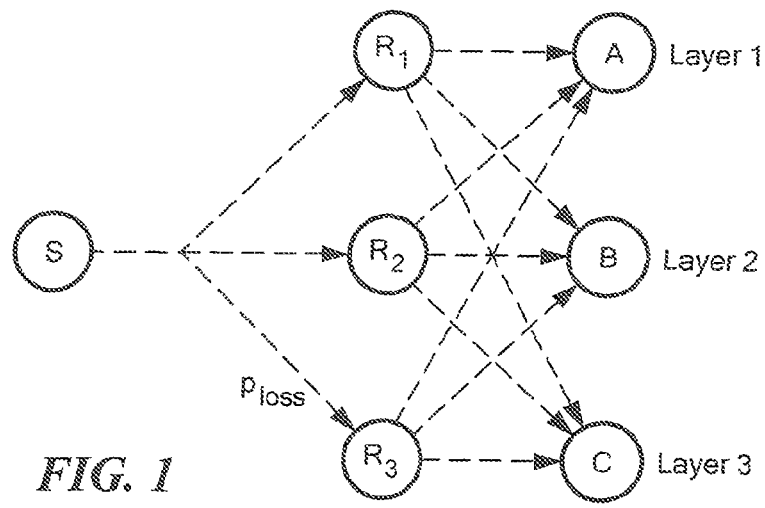
FIG. 1 is a block diagram of a source S which streams video to three sink nodes A, B and C through relay nodes R1, R2 and R3 in a wireless setting.

Referring now to FIG. 1, a source or server node S streams data, here corresponding to video in this exemplary embodiment, to three sink or receiver nodes A, B and C (or more simply "sinks" or "receivers") through relay nodes R1, R2 and R3 in a wireless setting. The probability of dropping a packet in each link (in dashed) is denoted as $P_{loss}$. The sinks A, B, C subscribed for different video quality, thus one must devise mechanisms to ensure reliable delivery over the wireless medium, and protection against unauthorized access. The operation of source node S is described in detail below (and particularly in conjunction with FIG. 4 below). It should be appreciated that references made herein to a particular type of data (e.g. video data) and a particular number of receiver nodes (e.g. three receiver nodes) is not intended as and should not be construed as limiting. Rather, such specific references are made herein solely to promote clarity in the description of the figures and the broad concepts described herein. Those of ordinary skill in the art will readily appreciate that the concepts, systems and techniques described herein find application in streaming any type of data and are not limited to streaming of video data.

Figure 2:
FIG. 2 is a block diagram of a coding system in which a source node generates multilayer video which is provided to a network encoder and is transmitted via a wireless transmission.

Referring now to FIG. 2, a source node S generates multilayer video and provides the multilayer video to a network encoder. Network encoder encodes the video (i.e. the video is fed to the network encoder) and is subsequently transmitted through a wireless network having relay nodes R1, R2, R3 (e.g. as shown in FIG. 1) to one or more destination or receiving nodes (e.g. nodes A, B, C as shown in FIG. 1). The video is fed to a network encoder and then undergoes the transmission in a wireless network.

One concept described herein is directed toward how to generate a secure, scalable stream by matching the multi-layer video generated by source node S with the network encoder.

In considering a network model and abstractions, one may consider an abstraction of a wireless network where the source S and relay nodes R1, R2, R3 only have access to the identifiers of the sinks (e.g. the IP addresses). Thus, there is no centralized knowledge of the network topology or of the encoding functions.

Figure 3:
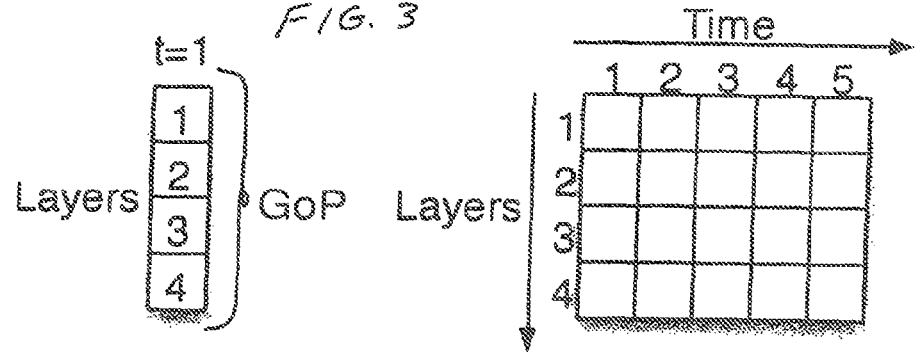
FIG. 3 is a layer model in which video data is divided into groups of pictures (GoP) with the duration of 1 second. GoPs are then subdivided into layers.

Referring briefly to FIG. 3, a layer model is shown. One can adopt a model of video layers as described in Z. Liu, Y. Shen, S. S. Panwar, K. W. Ross, and Y. Wang, "Using layered video to provide incentives in p2p live streaming," in *P2P-TV '07: Proceedings of the 2007 workshop on Peer-to-peer streaming and IP-TV*, New York, N.Y., USA, 2007, pp. 311-316, ACM. It should, however, be appreciated that other layer models may also be used in accordance with the concepts, systems and techniques described herein.

As illustrated in FIG. 3, video data is divided into "groups of pictures" or GoPs (also interchangeably referred to herein as "video segments") with a constant time duration. In the exemplary embodiment described, herein the GoPs have a duration of one (1) second. Other durations, may of course, also be used. The data is then encoded into L layers (with four (4) layers being shown in FIG. 3); each layer is divided into a fixed number of packets. It should be noted that each layer is dependent upon all previous layers. That is, layer 1 is necessary to decode layer 2, layer 2 is necessary to decode layer 3, etc.

Consider a threat posed by a passive attacker with the following characteristics: (1) the attacker can observe every transmission in the network; (2) the attacker has full access to information about the encoding and decoding schemes; (3) the attacker is computationally bounded, and thus unable to break hard cryptographic primitives.

The goal of the attacker is to recover the multicast video stream at the highest possible quality.

Network coding and security can be accomplished via random linear network coding (RLNC). RLNC is a completely distributed scheme to implement network coding protocols, whereby nodes draw several coefficients at random and use them to form linear combinations of incoming packets. The resulting packet is sent along with the global encoding vector, which records the cumulative effect of the linear transformations suffered by the original packet while on its path from the source to the destination. The global encoding vector enables the receivers to decode by means of Gaussian elimination.

Next described are concepts, techniques and systems related to secure network coding for video streaming.

Figure 4:
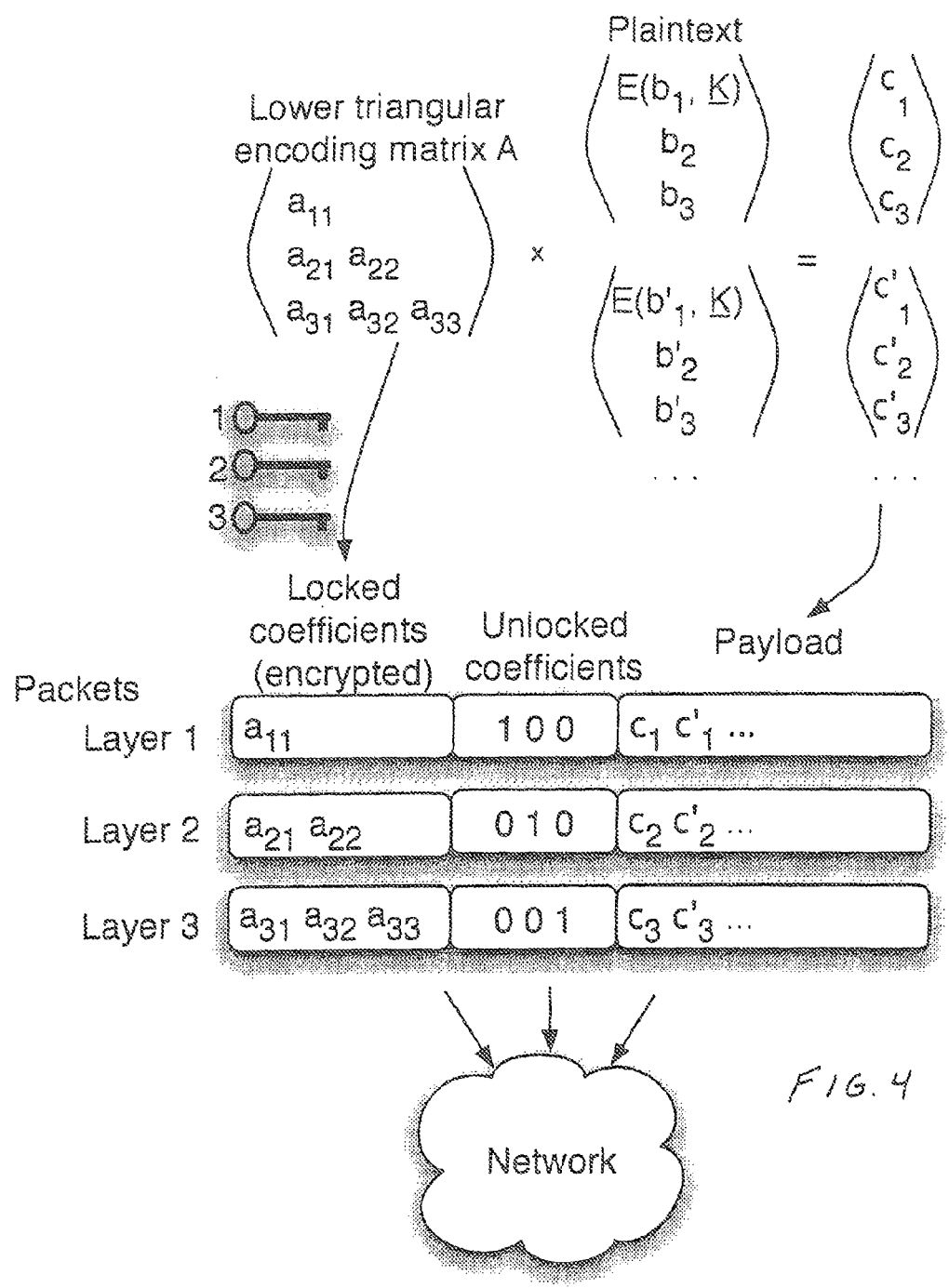
FIG. 4 is a diagrammatical illustration of operations performed at a source node.

Referring now to FIG. 4, the operations at a source node (e.g. source node S in FIGS. 1 and 2) are illustrated in FIG. 4. In general overview with reference to the exemplary embodiment illustrated in FIG. 4, a source node generates a 3×3 lower triangular matrix in which each non-zero element is chosen uniformly at random out of all non-zero elements of a finite field. The plaintext is divided into vectors of 3 elements and the first position of each vector is encrypted using a stream cypher. The matrix is multiplied by each of the vectors to generate the payload. The coefficients of matrix A are locked using one different key for each line of the matrix and placed in the header of the packets. One line of the identity matrix is generated for each line of the locked coefficients. The packets are then sent out to the network.

Proceeding now in more detail, the scheme starts with a one-time key distribution between the source node and the receiver nodes (aka sink nodes). As keys can be reused, only one key per layer is needed for multi-resolution encryption (a single key for the single resolution video case), that would be shared among all receiver nodes. Then, for each GoP, the source node generates an n×n lower-triangular matrix A, in which n is the number of layers in the GoP. Matrix A is used for encoding at the source node only. Each non-zero entry of A is an element $a_{ij}$ chosen uniformly at random from all non-zero elements of the field $F_q \backslash \{0\}$.

The GoP is then divided into vectors $b^{(1)} \ldots b^{(w)}$, in which the first symbol of each vector belongs to layer 1, the next symbol belongs to layer 2, etc. The number of vectors created is [size of GoP/n] (it should be appreciated that, for clarity, inconsistencies regarding the proportion between the number of symbols in the layers are ignored). Then, at least one symbol of each vector $\underline{b}^{(i)}$ is encrypted for each use of the encoding matrix. As layers are dependent—layer i is needed to decode layer i+1—a preferred approach is to encrypt the more informative base layer of the GoP in order to achieve maximum security (in this case, $b_1$ for each vector $\underline{b}^{(i)}$. The output of the operation of a stream cypher is denoted as a symbol P with a random key $\underline{K}$ as $E(P,\underline{K})$. Finally, the payload of the packets is composed by applying the encoding matrix A successively to the information symbols to be sent, i.e., the payload is formed by concatenating all the vectors $A(E(b_1, \underline{K}), b_2, \ldots, b_x)^T$.

Next, the source encrypts each line of matrix A with the corresponding layer key. Matrix A is the locked coefficients matrix. The source then generates a n×n identity matrix I, which corresponds to the unlocked coefficients. The packets are comprised of the header and the payload. The header includes the locked and unlocked. Note that, because of the nested structure of coding, determined by the triangular matrix, a packet from layer 1 corresponds to the first line of matrix A, a packet from layer 2 corresponds to the second line of matrix A, etc, so that each packet of layer x includes packets from layers 1, ..., x−1, x (i.e. a packet from an nth layer corresponds to the nth line of matrix A such that that each packet of layer x includes packets from layers 1, ..., x−1, x). Note also that when performing a linear combination of one packet of layer x with a packet of layer y>x, the resulting packet belongs to layer y.

The relays encode packets according to the rules of standard RLNC protocols. The algebraic coding is performed indistinguishably on unlocked coefficients, locked coefficients and payload. Relays identify the layer of a packet by looking at the first non-zero position in the unlocked coefficients, and packets are mixed with packets of the same or lower layers only.

The receiver nodes apply Gaussian elimination following standard RLNC over the unlocked coefficients. The locked coefficients are recovered by decrypting each line of the matrix with the corresponding key. The plaintext is then obtained by forward substitution. Note that the protected symbols should be encrypted with the key for the lowest level in the network (that is, $\underline{K}_1$), so that all legitimate participants in the protocol can decrypt the locked symbols. If layer 1 is to be accessible by all nodes in the network, the first line of the matrix should be sent unencrypted and the encryption of symbols should start at symbol 2.

Table I summarizes the scheme operation. What follows is an elaboration on the matching of multiresolution video and security, prioritization and scheduling issues as well as a security analysis.

TABLE I

| Initialization (source nodes): |
| --- |
| A key management mechanism is used to exchange n shared keys with the sink nodes (one for each layer); |
| The source node generates a n × n lower triangular matrix A in which each of the non-zero entries is an element from the multiplicative group of the finite field, $\alpha \in F_q \setminus \{0\}$; |
| The coefficients corresponding to a distinct line of the n × n identity matrix are added to the header of each coded packet. These correspond to the unlocked coefficients. |
| Each line *l* of the matrix A is encrypted with shared key $\underline{K}_l$ and placed in the header of each packet. These coefficients correspond to the locked coefficients; |
| The source node applies the matrix A to the packets to be sent, and places them in its memory. |
| Initialization (relay nodes): |
| Each node initializes n buffers, one for each layer in the network. |
| Operation at relay nodes: |
| When a packet of layer I is received by a node, the node stores the packet in the corresponding buffer; |
| To transmit a packet of layer I on an outgoing link, the node produces a packet by forming a random linear combination of the packets in buffers |

TABLE I-continued

| 1, ..., *l*, modifying both the unlocked and locked coefficients without distinction, according to the rules of standard RLNC based protocols. |
| --- |
| Decoding (sink nodes): |
| When sufficient packets are received: |
| The sink nodes perform Gaussian elimination on the matrix of unlocked coefficients, applying the same operations to the remainder of the packet, thus obtaining the original locked coefficients and coded packets; |
| The receiver then decrypts the locked coefficients using the corresponding keys Ki for level i; |
| The receiver performs forward substitution on the packets using the locked coefficients to recover the original packets; |
| The receiver decrypts the encrypted symbols to form the original plaintext. |

Bringing security to multiresolution video may be accomplished via a triangular encoding matrix. As seen, upon generating a new GoP, the source divides it into vectors $\underline{b}^{(1)} \ldots \underline{b}^{(w)}$, mixing all layers, and applies the matrix A to each of them to obtain the payload, that is: $c^{(i)} = A\underline{b}^{(i)}$.

Figure 5:
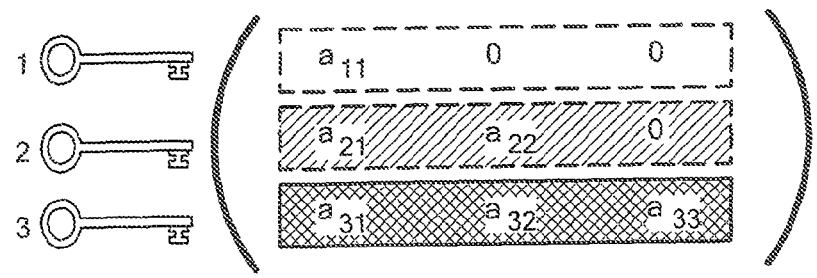
FIG. 5 is an Illustration of the encryption of the locked coefficients.

Referring now to FIG. 5, a plurality of different key layers are used to encrypt a corresponding plurality of different lines of a matrix A. As illustrated in FIG. 5, the encryption of the locked coefficients includes a first layer which corresponds to the first line of the matrix and is encrypted with the key for layer 1. The remaining locked coefficients are encrypted line by line according to a similar mechanism. This concept achieves security since only the recipients with the corresponding keys can decode the encrypted line, and consequently the layer.

It should be appreciated that standard network coding operations can be employed over the unlocked coefficients also when the layers are encrypted with different keys. Furthermore, even if packets from different layers are combined, reverting the operations through the use of unlocked coefficients subsequently reverts all combinations of different layers, so that the original information can be recovered (for simplicity of the discussion, and without loss of generality, one considers matrix A to have one row per layer 3).

It should be noted that traditional RLNC mixes all packets by using a full square matrix. This, however, is not suitable for layered coding, since it is not possible to extract individual layers unless one matrix is used for each layer. The triangular matrix coding described herein effectively mixes the layers, allowing for differentiated recovery of successive layers by nodes with different access levels, while relying on the dissemination of lower-level packets to achieve the resilience necessary for higher-level packets to be delivered in a timely fashion. Moreover, the triangular matrix form provides priority to the base layer, as all upper layer packets contain the base layer. Thus, the common prioritization and scheduling of the base layer is solved in a natural way. Below is provided a comparison of the concept and scheme described herein with traditional RLNC addressing scheduling and prioritization issues.

The choice of a triangular matrix further meets two important requirements. First, it allows removal of the arbitrary delay introduced by a typical RLNC full-matrix at the source, since the source can code packets as soon as they are generated and does not have to wait for the end of the generation to send them. Furthermore, the use of a triangular matrix also allows for a unique mapping between the unlocked and locked coefficients that does not compromise security: a non-zero unlocked coefficient in column i corresponds to the combination of packets $p_1, \ldots, p_i$ inside the corresponding packet. This is a way of determining the layer of a packet at relay nodes and allow the use of the feedback strategies for minimizing the decoding delay mentioned above.

Next described is a model used to perform a security analysis. Let $A=(\alpha_{ij})$ be the n×n lower triangular encoding matrix used for performing coding at the source. Each of the non-zero coefficients $a_{ij}$, $i \geq j$ is uniformly distributed over all non-zero elements of a finite field $F_q$, $q=2^u$, and mutually independent.

Let the original data, or plaintext, be a sequence of w vectors $\underline{b}^{(1)} \ldots \underline{b}^{(w)}$, in which $\underline{b}^{(x)}=(b_1^{(x)}, b_2^{(x)}, \ldots, b_n^{(x)})^T$, $1 \leq x \leq w$. All vectors $\underline{b}^{(x)}$ are independent of A. It is assumed that the successive refinement algorithm used to generate scalable video is optimal. Thus, $P(B_i = b_i) = (q-1)^{-1}$, $\forall b_i \in F_q \backslash \{0\}$. For simplicity in the proofs, it is assumed that the plaintext is pre-coded to remove zeros. This can be achieved by mapping elements of $F_q$ into $F_{q-1}$, thus incurring a negligible rate penalty of $(q-1)/q$.

The proofs are generalized to include more than one encrypted symbol per use of the encoding matrix. Also, m represents the number of encrypted symbols per reuse of the encoding symbols. We abstract from the particular cypher used for locking the coefficients. For the plaintext, the use of a stream cypher is assumed such that the probability of the output of the encoding operation $E(P, \underline{K})$ is independent of the plaintext P and the distribution of the output is uniform among all non-zero elements of $F_q \backslash \{0\}$, that is, $P(E(P, \underline{K}))=(q-1)^{-1}$. The parameters of the cypher should be adjusted to approximate these criteria. In the proofs, to obtain these properties, one considers the use of a one time pad in which one symbol of the key is used for each symbol of the plaintext that is encrypted. The key is represented by w random vectors $K^{(1)} \ldots K^{(w)}$, each with m positions (that is, with wm symbols of key in total). Furthermore, $P(K_i = k_i) = (q-1)^{-1}$, $\forall k_i \in F_q \backslash \{0\}$.

The vector to which the matrix is applied, that is, the vector $(E(b_1, K_1^{(1)}), \ldots, E(b_m^{(x)}, K_m^{(x)}), b_{m+1}^{(x)}, \ldots, b_n^{(x)})^T$, is denoted $\underline{e}^{(x)}$. Each payload vector is represented by $\underline{c}^{(x)}=(c_i^{(x)})^T$, where x corresponds to reuse x of A and $$c_i^{(x)} = (\sum_{j=1}^{\min(i,)} )a_{ij}E(b_j^{(x)} \cdot K_j^{(x)}) + (\sum_{1-m+1}) a_{i1} b_1^{(x)}.$$

In the description herein, random variables are described in capital letters and instances of random variables are represented in lowercase letters. Vectors are represented by underlined letters and matrices are represented in boldface. Without loss of generality, one can abstract from the network structure and consider the payload of all packets together in the security proofs. Characterized below is the mutual information (denoted by $l(\bullet; \bullet)$) between the encoded data and the two elements that can lead to information disclosure: the encoding matrix and the original data itself. Theorem 1 evaluates the mutual information between the payload and the encoding matrix, and Theorem 2 evaluates the mutual information between the payload and the original data.

Theorem 1: The mutual information between A and AE(1), AE(2), ..., AE(w) is zero:

$$l(A; A\underline{E}^{(1)}, A\underline{E}^{(2)}, \ldots, A\underline{E}^{(w)}) = 0.$$

Theorem 1 is a generalization of the result in Equation 24 and shows that the cost of a statistical attack on the encoding matrix is the cost of a brute-force attack on all entries of the matrix, independently of the number of reuses.

Theorem 2: The mutual information between $\underline{B}^{(1)}, \ldots, \underline{B}^{(w)}$ and $A\underline{E}^{(1)}, \ldots, A\underline{E}^{(w)}$ is given by the expression:

$$l(\underline{B}^{(1)}, \ldots, \underline{B}^{(w)} \text{ and } A\underline{E}^{(1)}, \ldots, A\underline{E}^{(w)}) = \log(q-1)\max(f(w,n,m), 0),$$

where $f(w,n,m) = w(n-m) - \binom{n(n+1)}{2}$.

The equation in Theorem 2 shows that the cost of attacking the plaintext is the cost of discovering the encoding matrix. Thus, one gets a threshold at which there is a reduction of the search space needed to attack the plaintext due to multiple reuses of the matrix A. Notice that there is no disclosure of the plaintext with a single use of the encoding matrix. Below the number of uses in the threshold, the mutual information is 0 and thus, it is not possible to perform a statistical attack on the payload. When the number of uses of the encoding matrix surpasses the threshold, the mutual information grows with w. In the extreme case in which the number of encrypted symbols is equal to the number of symbols in the matrix, the mutual information is always zero (however, in this case, one would not require the encoding matrix to be hidden).

The triangular matrix grants unequal protection to the layers of the plaintext. One can easily see that the search space for discovering layer i+1 is larger than the search space to discover layer i. Take, for instance, the case in which m=0—then, for layers i and i+1, an attacker needs to guess, respectively, i and i+1 entries of the matrix.

It is believed that the expression in Theorem 2 allows fine tuning the trade-off between complexity and security by varying n (the size of the matrix), m (the number of encrypted symbols) and the size of the field.

Figure 6:
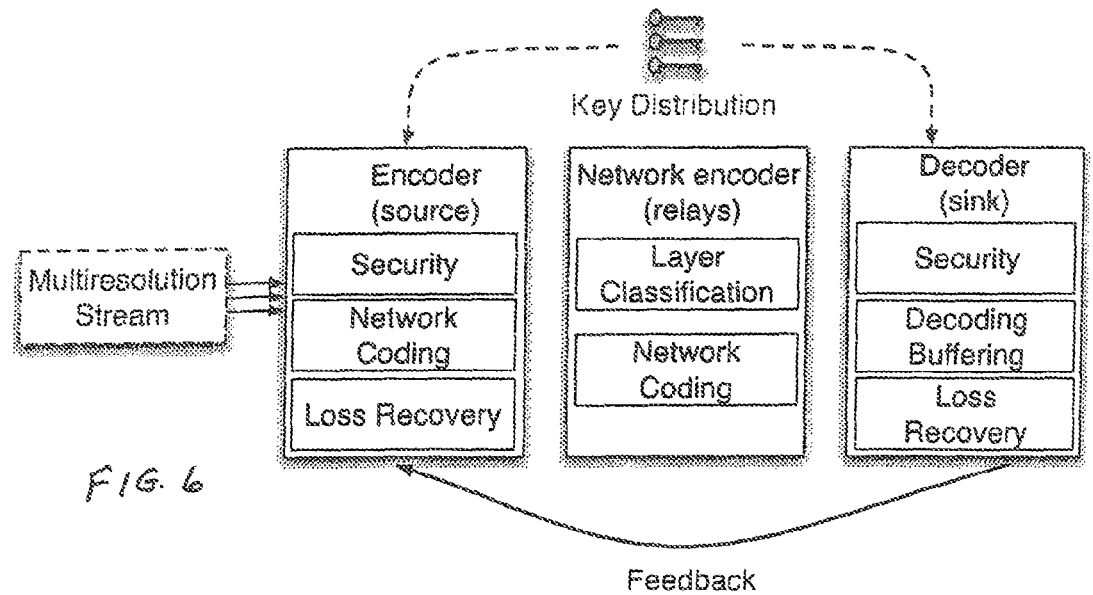
FIG. 6 is a block diagram illustrating modules of one exemplary system implementation (entities that are external to the system, i.e. key distribution and generation of a multiresolution stream, are in dashed.

Referring now to FIG. 6, an exemplary system includes a source node S, a relay node R and a receiver which comprises a decoder D. Also shown in FIG. 6 are a multi-resolution stream and a key distribution system K which are illustrated in phantom since they are external to the system. Consider a scenario such as the one in FIG. 1, with a system architecture as depicted in FIG. 6, the different components of the system and their practical implications are next described.

The technique described herein requires shared keys between source nodes and destination nodes. While the specifics of a particular key distribution mechanism are not relevant to the concepts described herein, exemplary key distribution techniques include, but are not limited to, offline pre-distribution of keys or authentication protocols such as Kerberos or a Public Key Infrastructure (PKI). It should be noted that the need for keys to be shared among several legitimate nodes in a network arises frequently in multicast scenarios and is commonly denominated as broadcast encryption or multicast key distribution. Layer 1 nodes should keep l keys (one for each layer), and thus, the number of keys exchanged is equal to $\Sigma(^L_{l=1})lt_l$, in which $t_l$ represents the number of recipients of layer l in the network and L the total number of layers in the stream.

With respect to multiresolution encoder encoding and security the main requirements of security protocols for multimedia streams are: (i) to work with low complexity and high encryption efficiency, (ii) to keep the file format and synchronization information and (iii) to maintain the original data size and compression ratio. As can be seen from the description provided herein, the scheme described herein has been designed to meet criterion (i). Criterion (ii) is codec-dependent, but in general the scheme described herein is able to meet it. Taking, for example, the MJPEG video codec4, one can use the JPEG2000 option of placing all headers from all blocks of the image on the main header of the file and satisfy criterion (ii). Finally, network coding does not change the size or compression ratio of the stream, so the scheme described herein satisfies criterion (iii).

As also shown herein, the maximum level of security is obtained when the compression is optimal and yields a result that is nearly uniform. Thus, the scheme described herein imposes a set of parameters for the codec in order to maximize the entropy of the file. In the MJPEG codec, two such coding decisions would be to choose larger tile sizes and maximum compression rate on the arithmetic coding step. Another approach would be to perform an extra data protection step together with compression. The size of the base layer can be seen as another parameter to increase the compression ratio. As an example, in JPEG2000, each encoded symbol increases the resolution of the stream, therefore it is possible to vary the size of each layer taking the constraints of the security mechanism into consideration.

The source encoder node S includes security, loss recovery and network coding modules. The security module and its interoperation with network coding are described herein e.g. in conjunction with FIG. 4 above.

However, it should be appreciated that more than one row of the matrix for each layer is used. In that case, the mapping between the unlocked and locked coefficients suffers a shift: if 2 packets per layer are used, a packet with unlocked coefficients vector (1, 1, 0, . . . 0) belongs to layer 1 and a packet with vector (1, 1, 1, 0, . . . 0) belongs to layer 2. The division of the payload into vectors should also accommodate this shift. Codecs in which each new symbol (decoded in order) contributes to increased resolution of the output video (such as the MJPEG2000) might benefit from an approach with a finer granularity. This granularity can be fine-tuned by the number of lines of the encoding matrix that belong to each layer. Another important system requirement is to use an encryption mechanism for which the ciphertext is of the same size of the plaintext (e.g. AES in stream cipher mode) in order to keep the size of the symbols constant.

An important aspect of the encoder is the rate at which intermediate nodes generate and send linear combinations to the receiver. If a relay generates and forwards a linear combination every time an innovative packet from the server is received, then many redundant packets may arrive at destinations. To solve this issue, the server generates a credit for each coded packet, which is further assigned to one of the intermediate relays. Next, only the relay who receives also the credit associated with the packet is allowed to send a linear combination.

After transmitting a complete generation, and before streaming the next one, the server starts the loss recovery process. To recover lost packets, the server sends redundant linear combinations for each layer, mixing all packets of the layer. This process continues until all the receivers for that layer can decode or the server has another segment to stream.

The network encoder is a component of the wireless relays of the network and includes layer classification and network coding. As described above-packets of layer l should only be combined with packets of lower layers, i.e., l, l-1, . . . 1. This is done in order to maintain the diversity of layers in the network, because when combining a packet of layer l with layer l+1, the layer of the resulting packet is l+1. After classifying the packet, a relay generates and forwards a linear combination if he received the credit assigned to that packet.

The decoder is a component of the receiver that includes security, decoding and buffering and feedback. When enough packets are received, the receiver performs Gaussian elimination to decode packets using the unlocked coefficients. The security process corresponds to the recovery of the locked coefficients and encrypted symbols of the payload and is explained above.

Since in the scheme described herein relay nodes perform coding on the packets of the same (and lower) layers, the shape of the triangular matrix sent by the source is not kept through the network. Thus, a received packet, even if innovative in terms of rank, might not be decodable immediately. Hence, the system described herein requires a decoding buffer at the receivers. This decoding buffer takes into account the maximum allowable delay of the video stream, similar to the play buffer at the receivers, and will preemptively flush the current undecoded packets if the delay requirement is not met. Once a full layer is decoded, it is stored in the playback buffer.

A node starts the playback once it decodes a number of segments in the lowest quality. If a frame is not received until the time of playback, then it is discarded and the subsequent frame is played instead. Likewise, if the frame is available in a lower quality, it is played in a lower quality than the one the node has access to. At time step k the node plays segment k in the quality in which it is available. If the segment was not decoded (not even in the lowest quality), then the node stops the playback process and starts buffering. If after some buffering timeout, the node decodes segment k, then it plays it in the quality in which it is available; otherwise, the node skips segment k and plays the next one.

Considering a system with minimal feedback, in order to free the wireless channels from unnecessary transmissions, the receivers send positive feedback to the server whenever they decode a segment in the desired quality. For example, a layer 3 receiver sends a unique feedback packet when it has decoded layers 1, 2 and 3.

Next described is an evaluation of the system described herein in terms of security complexity as well as an evaluation of system performance in a lossy wireless scenario.

Figure 7:
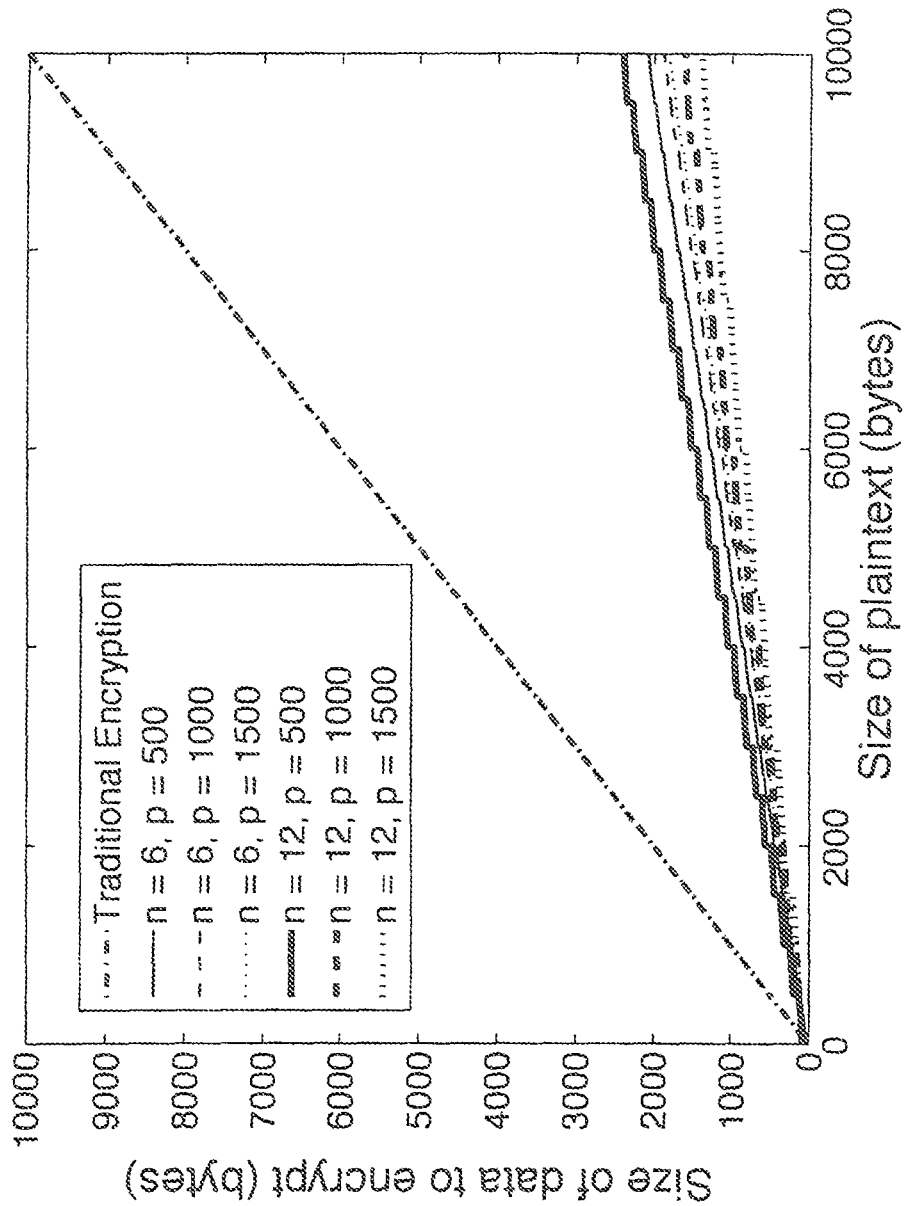
FIG. 7 is plot of size of data to be encrypted for the scheme described herein versus traditional encryption (encryption of the whole data).

Referring now to FIG. 7, a volume of data to be encrypted according to the size of the plaintext for the scheme described herein is compared with traditional encryption, for typical packet sizes of 500 bytes (for video packets in cellular networks), 1000 bytes (for example, for video over wifi networks) and 1500 bytes (the typical IP packet size). In this example, one encrypted symbol per generation is assumed. For traditional encryption mechanisms, which perform end-to-end encryption of the entire payload, the volume of data that must be encrypted increases linearly with the size of the protected payload. It is not difficult to see that the scheme described herein substantially reduces the size of information to be encrypted. The gains get higher as the maximum size of the packet increases, since the number of matrices to be generated is smaller, and more data can be sent in each packet containing the same matrix of coefficients.

Naturally, the required number of cryptographic operations is directly related to the volume of data to be encrypted. If one considers a stream cipher, the number of encryption operations increases linearly with that volume, and therefore, the computational complexity is greatly reduced by the novel scheme described herein as shown in FIG. 7. Note that these values are indicative only, and correspond to the theoretical gains when the size of the packet is the only parameter determining the number of reuses of the encoding matrix. The security penalty, which is quantified in above, is not considered for the purposes of this analysis. Note as well that the end values depend on the design of the codec, as well as on the size chosen for each layer.

Communication and Computational overhead are next discussed.

The ability to reduce the volume of data to be encrypted comes at the cost of including locked coefficients in the data packet.

Table II shows the overhead introduced by the novel scheme described herein for each packet and for coefficients with size of 8 and 16 bits, for some values of reference for wireless networks with nodes with several processing capabilities.

TABLE II

VOLUME OVERHEAD OF LOCKED COEFFICIENTS (PER PACKET).

| MAXIMUM IP PACKET SIZE | #CODED PACKETS h | OVERHEAD IN $F_q$ | |
|---|---|---|---|
| | | $q = 2^8$ | $q = 2^{16}$ |
| 500 | 4 | 0.80% | 1.60% |
| | 8 | 1.60% | 3.20% |
| | 12 | 3.20% | 6.40% |
| 1000 | 4 | 0.40% | 0.80% |
| | 8 | 0.80% | 1.60% |
| | 12 | 2.40% | 4.80% |
| 1500 | 4 | 0.27% | 0.53% |
| | 8 | 0.53% | 1.07% |
| | 12 | 0.80% | 1.60% |

Note that the inclusion of locked and unlocked coefficients allows avoidance of the use of homomorphic hash functions, which are very expensive in terms of computation.

Due to the inclusion of an extra set of coefficients (the locked coefficients), the novel scheme described herein requires additional operations, which are shown in Table III. For the purpose of the analysis described herein, it is considered that, in comparison to the multiplication, the sum operation yields negligible complexity.

TABLE III

COMPUTATIONAL COST OF INCLUDING THE LOCKED COEFFICIENTS

| NODE | OPERATION | DETAILED COST | TOTAL COST |
|---|---|---|---|
| Source Node | Generation of vectors of identity matrix | negligible | — |
| | Encryption of locked coefficients | See Section V-A1 | |
| Relay Node | Performing extra random linear operations on locked coefficients (combining t packets) | nh multiplication operations and (n − 1)h sum operations | O(nt) |
| Sink Node | Decrypt locked coefficients to obtain the matrix ML of plain-text locked coefficients | See Section V-A1 | O(n2) |
| | Forward-substitution using recovered locked coefficients | O(n2) | |
| | Decrypt one encrypted symbol per use of the encoding matrix | See Section V-A1 | |

Next described is wireless video performance. An evaluation is provided of the performance of the protocol described above in the multi-hop multi-path scenario from FIG. 1, in which the server S sends video to three (3) heterogeneous receivers A, B and C, through relays R1, R2 and R3, over lossy wireless links. In the description hereinbelow, the focus is solely on the performance of the scheme in terms of throughput and robustness to losses, and its ability to deliver quality video to a heterogeneous set of receivers. The novel layered network coding model (scheme NC1) described herein is compared to a standard RLNC (scheme NC2) and also to an implementation without network coding (scheme WoNC). In scheme NC2 the server sends a different stream for every layer. Each segment is encoded in different qualities, using a full coefficient matrix for each layer. Relay nodes perform RLNC operations on the received packets that belong to the same generation and to the same or lower layers. In this case, since a sink of layer L needs to receive a full-rank matrix for layers 1, 2, . . . L, sinks acknowledge each layer that they decode. Error recovery is similar to scheme NC1. In scheme WoNC, the server sends the native packets without coding them. In this case, the intermediate nodes just forward uncoded packets normally. The sinks send as feedback the ids of the packets they received. If some packets are lost, the server retransmits them.

A simulation setup is next described. The ns-2 simulator 2.33 described in S. Mccanne, S. Floyd, and K. Fall, "ns2 (network simulator 2)," http://www-nrg.ee.lbl.gov/ns/ with the default random number generator is used for this version. The network coding libraries are independently programmed. The video stream is a constant bit rate traffic over UDP, where the server is streaming at 480 kbps during 100 seconds. Each layer has a fixed size of 20 packets and three (3) layers for the system are considered. This yields a generation of 60 packets, corresponding to 1 second of video. The packet size is 1000 bytes. As a propagation model, two-ray ground is used and the loss probability $P_{loss}$ is taken as a simulation parameter. Since it was shown that RTS/CTS has a negative impact on the performance, it was disabled for all experiments. In order to simulate heavy loss conditions, MAC layer retransmissions were also disabled. The rate at the MAC layer is 11 Mbps.

The receivers start to playback the video stream once they have decoded at least five (5) segments of the lowest quality. The buffering timeout for a segment that has not been decoded until its playback deadline arrives is set to one (1) second. Furthermore, a perfect feedback channel is assumed (that is, no feedback packets are lost). In order to take full advantage of the broadcast nature of the wireless medium, the relays listen to transmitted packets in promiscuous mode.

The following metrics: (i) played rate at the receivers, (ii) initial buffering delay, the time interval from receiving the first packet to the beginning of the playback, (iii) decoding delay, the time elapsed from receiving the first packet of a segment until that segment is decoded, (iv) skipped segments, percentage of segments skipped at playback, (v) lower quality segments, percentage of segments played in lower quality than the one requested, (vi) playback quality, average quality in which each segment is played and (vii) load on the server, defined as the ratio between the total rate sent by the server and the streaming rate. In all plots, each point is the average of 10 runs and the vertical lines show the standard deviation.

FIGS. 8-14 illustrate results achieved via the concepts, techniques and systems described herein.

Figure 8:
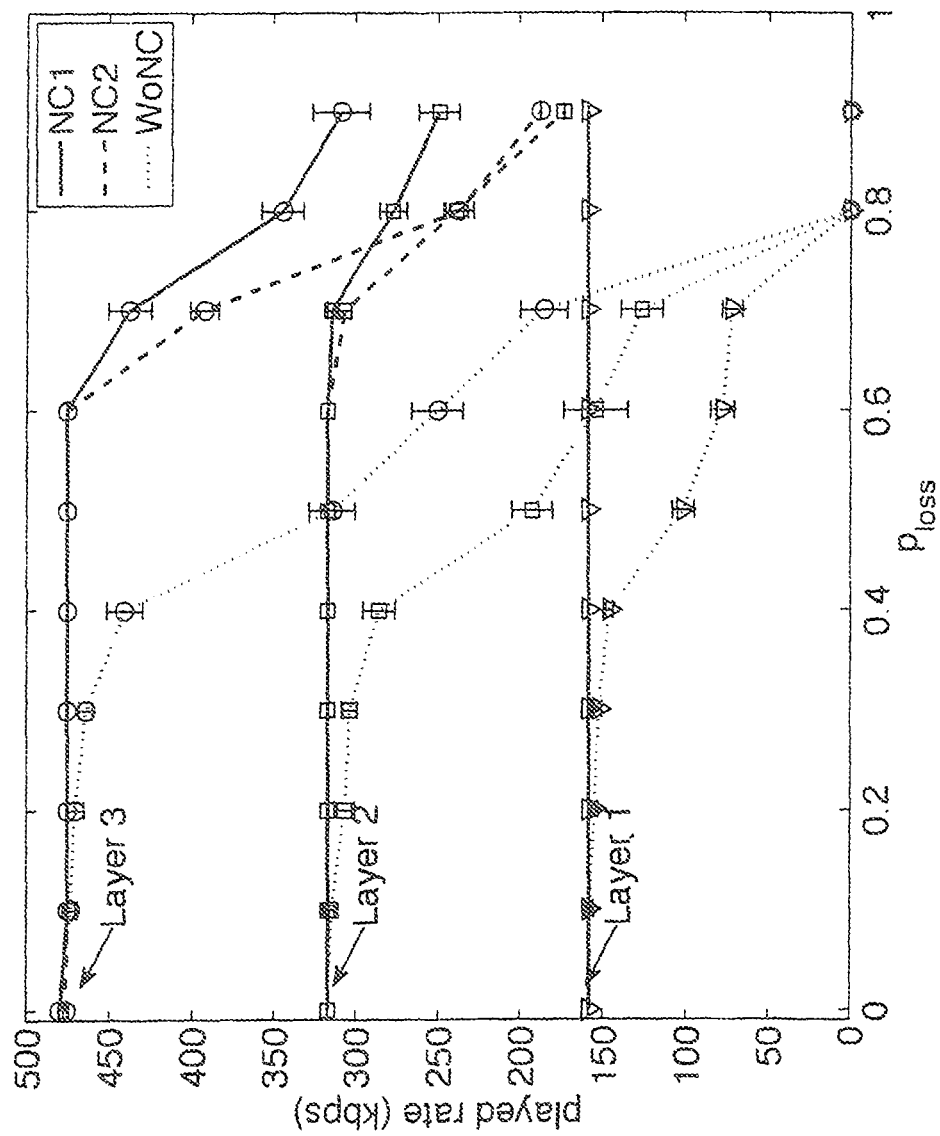
FIG. 8 is a plot of played rate as a function of loss probability $P_{loss}$, for the scheme described herein (NC1), three streams with network coding (NC2) and without network coding (WoNC).

Referring now to FIG. 8, the rate played by each receiver vs. loss probability is shown. Played rate as a function of loss probability $P_{loss}$, for the technique described herein (NC1), three streams with network coding (NC2) and without network coding (WoNC) as shown. As can be seen from examination of FIG. 8, scheme NC1 and scheme NC2 are less affected by losses, due to the inherent reliability of network coding in volatile environments, with the scheme described herein performing consistently better. Scheme WoNC, as expected, performs poorly as the medium becomes unreliable.

Figure 9:
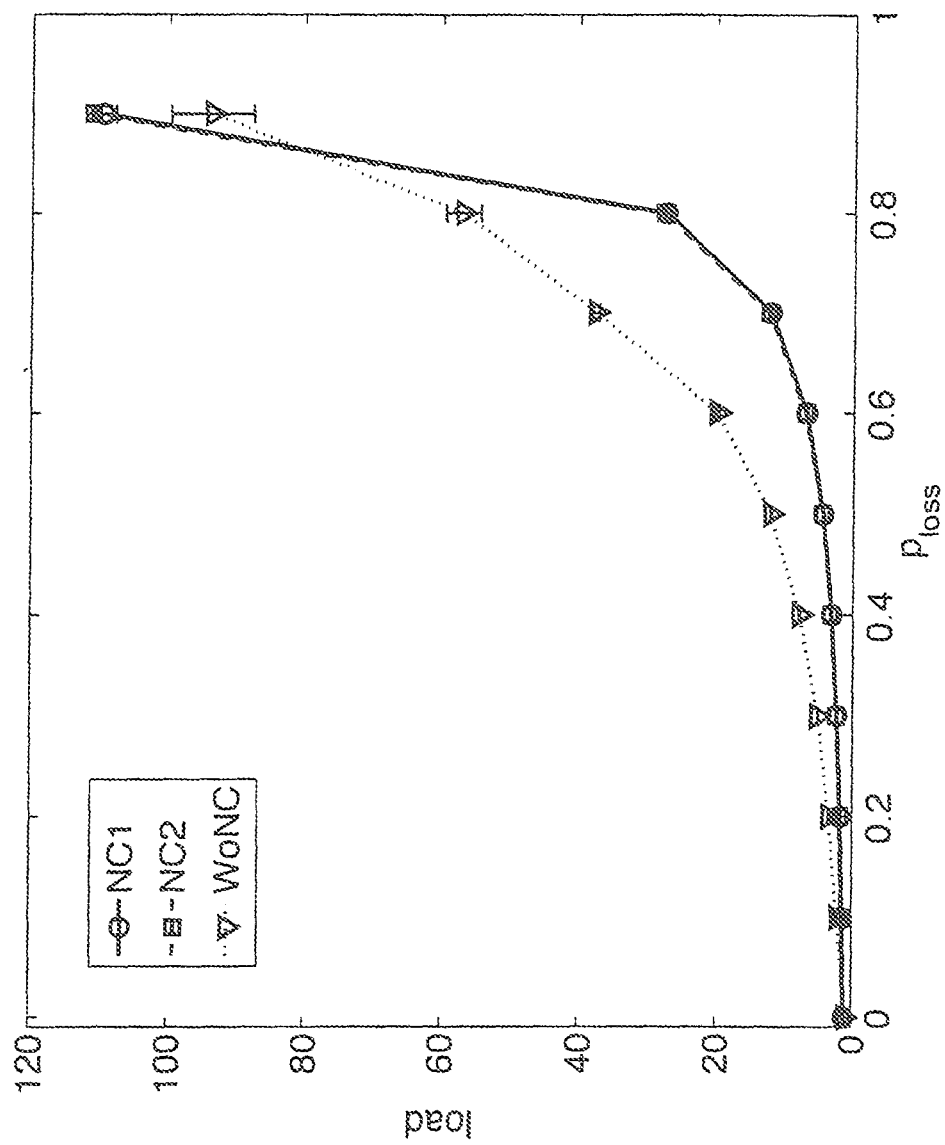
FIG. 9 is a plot of the load on the server as a function of the loss probability $P_{loss}$.

Referring now to FIG. 9, the load on the server in function of the loss probability Ross is shown. One can see in FIG. 9 that the load on the server grows exponentially as the loss increases. In general, the network coding approaches need to send less coded packets to recover losses. At $P_{loss}$=0.9, the load is slightly higher for network coding since the server preemptively sends redundant packets until it receives the feedback from the receiver that the segment is decoded, while for scheme WoNC the server retransmits packets only when it receives feedback from the receivers. Since most of the packets are dropped, scheme WoNC never retransmits.

Figure 10:
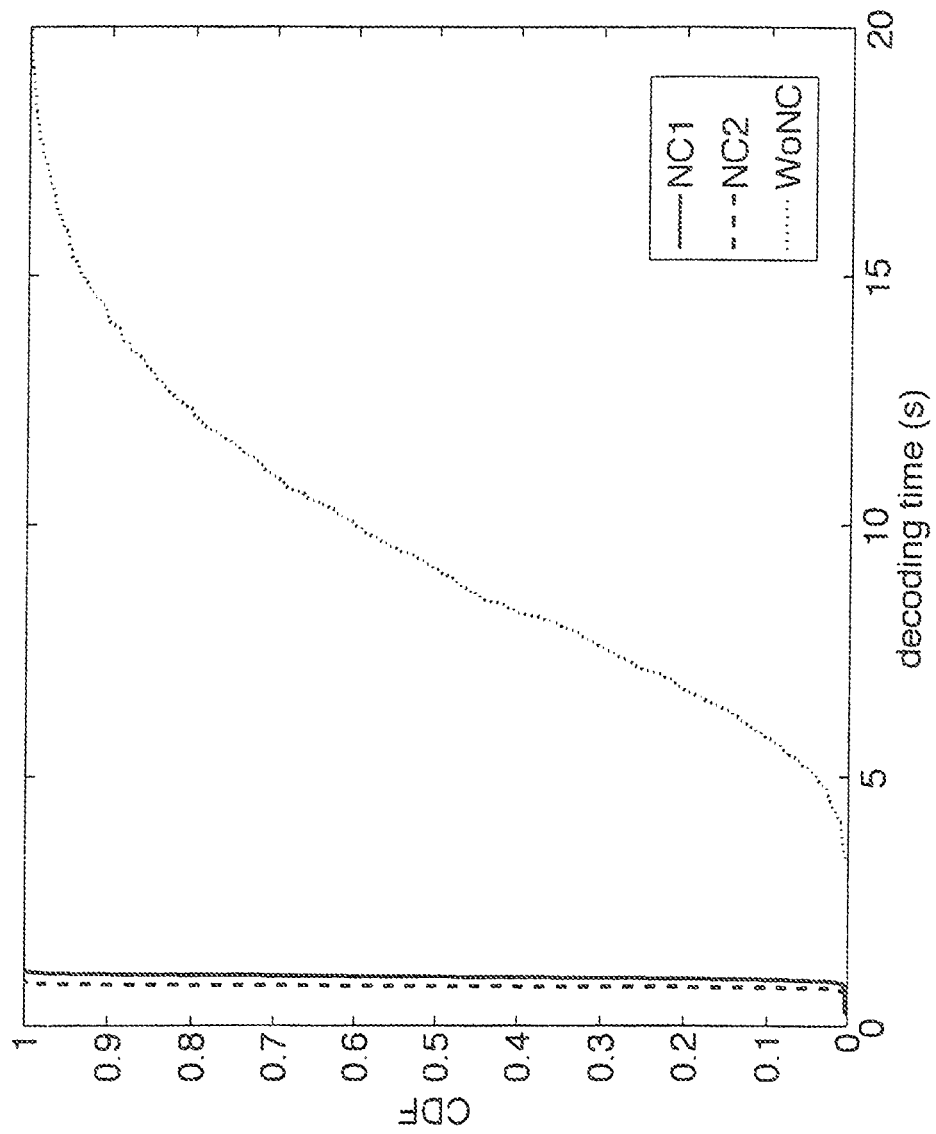
FIG. 10 is a plot of CDF versus decoding time for loss probability $P_{loss}$=0.4, for layer 3. 0 0.2 0.4 0.6 0.8 1

Referring now to FIG. 10 CDF of decoding delay for loss probability $P_{loss}$=0.4, for layer 3 is shown. FIG. 10 shows that the network coding approaches are able to decode segments within a second as the server sends redundant linear combinations in a feed-forward manner. Scheme WoNC needs a longer decoding time, because the server waits for the feedback before retransmitting. The plot shown corresponds to a layer 3 receiver and the behavior for other layers is similar.

Figure 11:
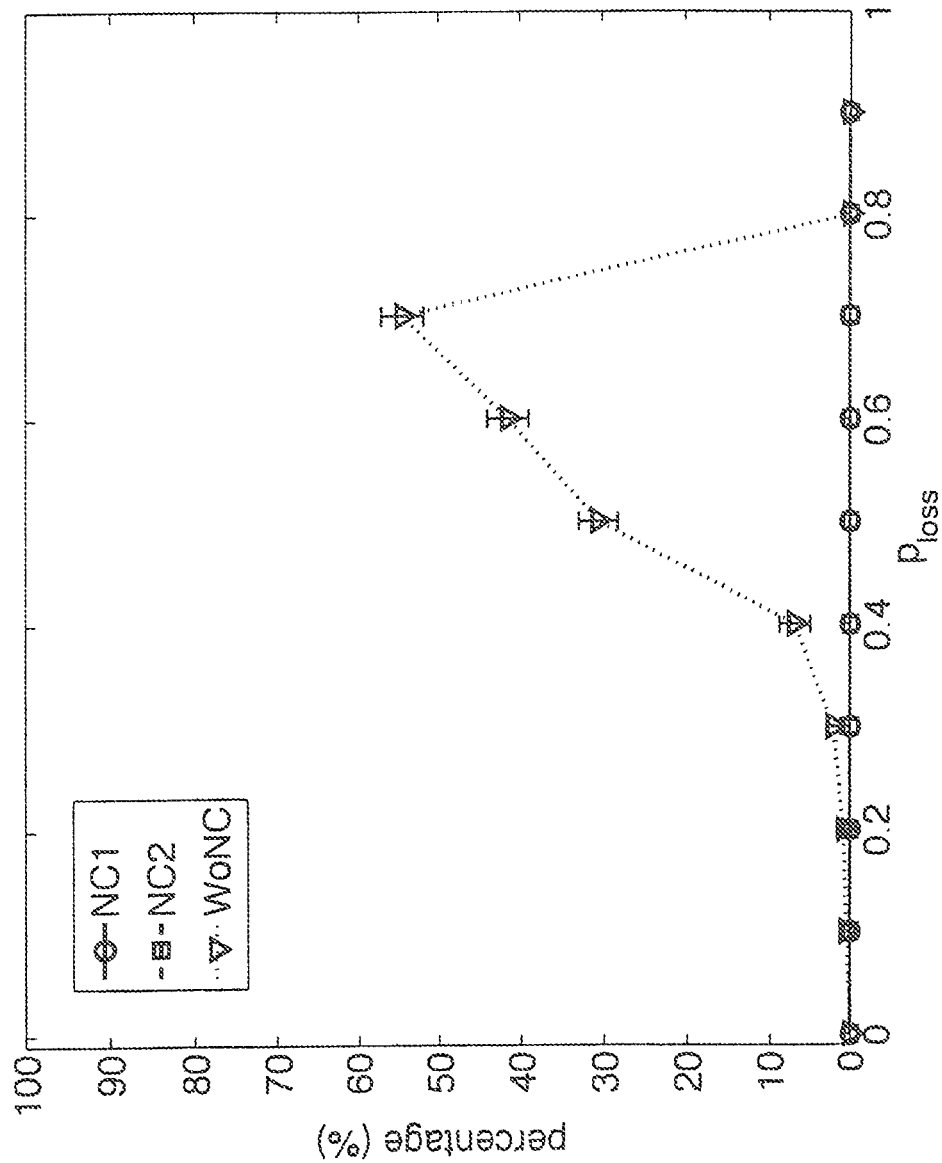
FIG. 11 is a plot of percentage of skipped segments versus probability of loss, $P_{loss}$, for layer 3.
Figure 12:
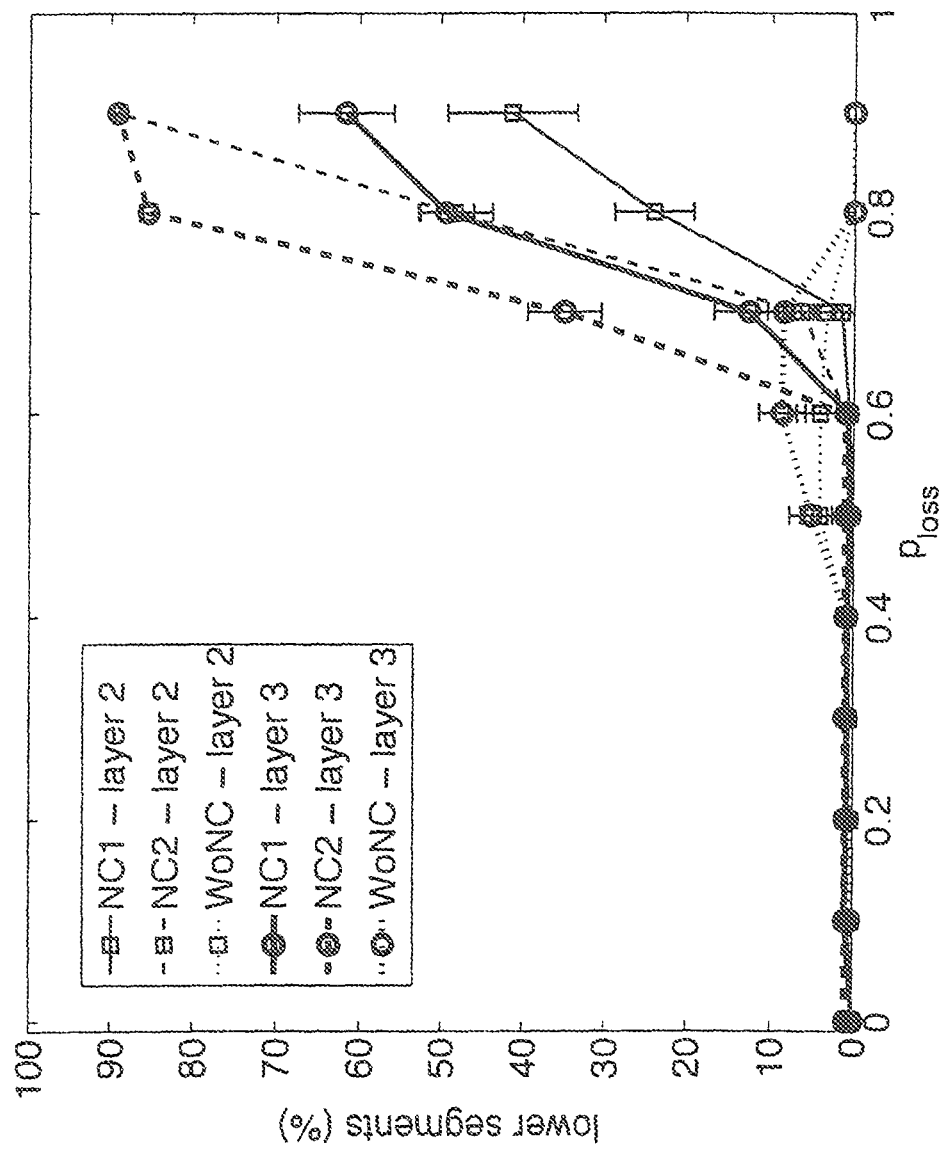
FIG. 12 is a plot of percentage of segments played in lower quality as a function of the probability of loss $P_{loss}$.

Referring now to FIGS. 11 and 12, these figures show the percentage of segments that are skipped and played in lower quality, respectively. Note that with network coding, no segments are skipped for any layers, and, as expected, more segments are played in lower quality as the losses increase. On the other hand, without network coding, there are fewer segments played in lower quality, but at the same time the percentage of skips grows significantly with ploss, because the packets retransmitted by the server do not arrive at the receivers in due time. This effect is exacerbated at higher losses, where no segment is ever played (and hence never skipped either).

Figure 13:
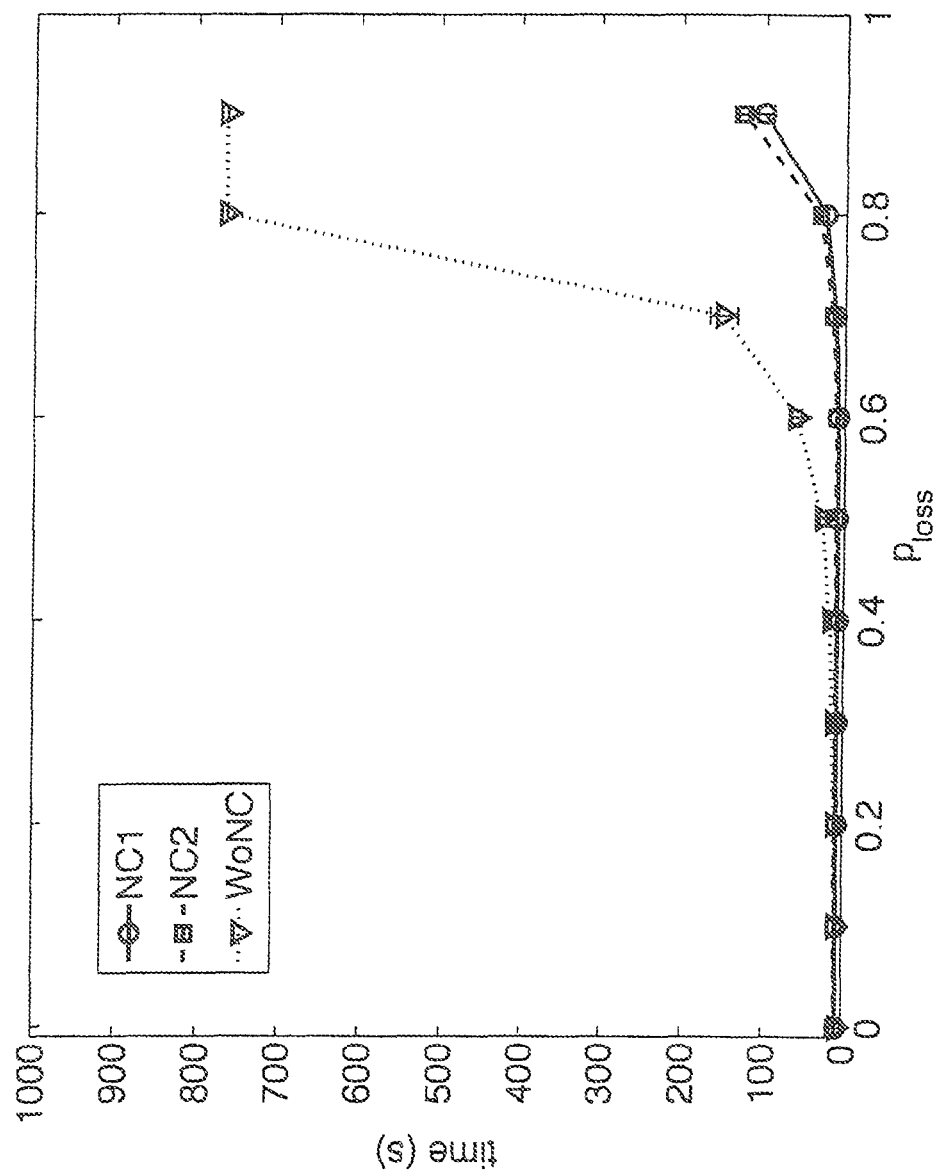
FIG. 13 is a plot of initial buffering delay as a function of loss probability $P_{loss}$, for layer 3.

Referring now to FIG. 13, Initial buffering delay in function of loss probability ploss, for layer 3 is shown. One can see in FIG. 13 that for our scheme, the receivers buffer for a shorter time before starting the playback. The initial buffering delay grows slowly with the probability of loss, because a single network coded packet can recover multiple losses. For scheme WoNC, when losses are high, the receivers are not able to decode anything, thus they never start to play the file.

The plots shown in FIGS. 11 and 13 correspond to layer 3. The behavior for other layers is similar and slightly better, since layer 3 receivers need to receive more packets than lower layer nodes.

Figure 14:
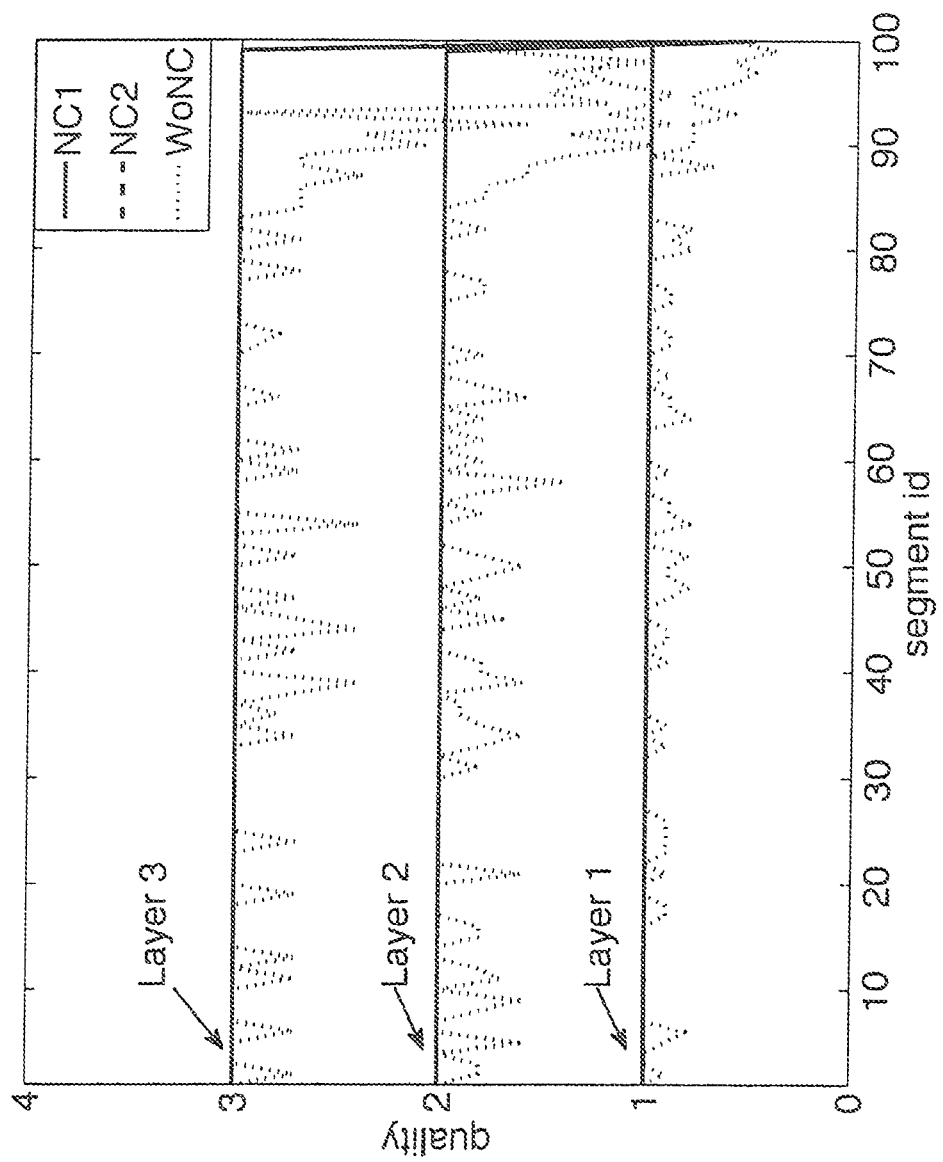
FIG. 14 is a plot of played quality as a function of segment ID for $P_{loss}$=0.4.

Referring now to FIG. 14, a plot of Played quality for $P_{loss}$=0.4 is shown. FIG. 14 shows the average quality in which every segment is played, when $P_{loss}$=0.4. A skipped segment accounts as played in a quality equal to 0. Note that the network coding approaches show a high resilience to errors and the video file is constantly played in the desired quality by each receiver compared to scheme WoNC, again with our scheme showing better performance.

Finally, it should be noted that the scheme described herein outperforms scheme NC2 due to the triangular encoding matrix used for coding and to the nested structure of the video layers. These characteristics result in a higher robustness to losses (FIG. 8), better video quality with fewer skips and fewer segments played in lower quality (FIG. 12) and shorter buffering delay (FIG. 13).

Described herein is a practical scheme for scalable video streaming that exploits the algebraic characteristics of random linear network coding (RLNC).

On the one hand, the concepts, systems and schemes described herein ensure differentiated levels of security for distinct users. On the other hand, the properties of the network coding paradigm assure the resilience to packet losses over wireless channels. The security evaluation proves that it is possible to reduce significantly the number of encryption operations (or, equivalently, the complexity requirements) while quantifying the security levels.

It should be noted that the system and techniques described herein were focused on eavesdropping attacks. Network pollution attacks can be dealt with using conventional techniques in albeit some conventional techniques have added in terms of delay and complexity.

As part of our ongoing work we are looking at ways to mitigate the effects of such Byzantine attacks under the real-time constraints of streaming services.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:

1. A method for streaming data in a network including a server node, a plurality of relay nodes and one or more receiver nodes, the method comprising:
    performing a one-time key distribution between the source node and each of the one or more receiver nodes;
    dividing the data into more than one group, each of the more than one group having a predetermined time of duration;
    for each group, generating at the source node an n×n lower-triangular matrix A, in which n is the number of layers in the group wherein matrix A is used for encoding at the source only and each non-zero entry of matrix A is an element au chosen uniformly at random from all non-zero elements of the field $F_q\backslash\{0\}$;
    dividing the group into a plurality of vectors $\underline{b}^{(1)} \ldots \underline{b}^{(w)}$, each of the vectors having K symbols $S_1$-$S_K$ in which the $k^{th}$ symbol of each vector belongs to a corresponding one of the n layers in the group and wherein the number of vectors created is computed as size of group/n;
    encrypting at least one symbol of each vector $\underline{b}^{(i)}$ for each use of the encoding matrix wherein the output of the operation of a stream cypher is denoted as a symbol P with a random key $\underline{K}$ as $E(P,\underline{K})$;
    applying the encoding matrix A successively to the information symbols to be sent to provide encoded information symbols which comprise a payload of one or more packets;
    encrypting each line of a first matrix A with a corresponding layer key wherein the first matrix A corresponds to a locked coefficients matrix;
    generating an n×n identity matrix corresponding to the unlocked coefficients wherein each of the one or more packets comprise a header and the payload and wherein the header comprises the locked and unlocked coefficients;
    encoding the one or more packets in relay nodes in accordance with a random linear network coding (RLNC) protocol wherein algebraic coding is performed on unlocked coefficients, locked coefficients and payload; and the relay nodes identify the layer of a packet by looking at the first non-zero position in the unlocked coefficients, and packets are mixed with packets of the same or lower layers only.

2. The method of claim 1 wherein performing algebraic coding on unlocked coefficients, locked coefficients and payload comprises performing algebraic coding indistinguishably on unlocked coefficients, locked coefficients and payload.

3. The method of claim 1 further comprising:
applying, via the receivers, Gaussian elimination over the unlocked coefficients;
recovering the locked coefficients by decrypting each line of the matrix with the corresponding key; and
obtaining plaintext by a substitution process.

4. The method of claim 3 wherein the protected symbols are encrypted with the key for the lowest level in the network such that all legitimate participants in the protocol can decrypt the locked symbols.

5. The method of claim 4 further comprising:
sending a first line of the matrix unencrypted; and
starting the encryption of symbols at symbol 2 so that layer 1 is accessible by all nodes in the network.

6. The method of claim 1 wherein only a single key per layer is used for multi-resolution encryption and wherein the single key is shared among all receivers.

7. The method of claim 6 wherein encrypting comprises encrypting the base layer of the group in order to achieve maximum security.

8. The method of claim 7 wherein composing a payload of the packets includes forming the payload by concatenating all the vectors $A(E(b_1,\underline{K}), b_2, \ldots, b_x)^T$.

9. The method of claim 6 wherein encrypting each line of matrix A with a corresponding layer key comprises encrypting each line of matrix A with a corresponding layer key via the source.

10. The method of claim 6 wherein:
a packet from an nth layer corresponds to the nth line of matrix A such that that each packet of layer x includes packets from layers $1, \ldots, x-1, x$.

11. The method of claim 10 further comprising:
sending a first line of the matrix unencrypted; and
starting the encryption of symbols at symbol 2 so that layer 1 is accessible by all nodes in the network.

12. The method of claim 11 wherein when performing a linear combination of one packet of layer x with a packet of layer y>x, the resulting packet belongs to layer y.

13. A method of generating packets for transmission on a network, the method comprising:
generating an n×n lower triangular matrix in which each non-zero element is chosen uniformly at random out of all non-zero elements of a finite field;
dividing plaintext into vectors of elements wherein a first position of each vector is encrypted using a stream cipher; and
multiplying the matrix by each of the vectors to generate a payload of the packets wherein coefficients of the matrix are locked using one different key for each line of the matrix and placed in a header of the packets.

14. The method of claim 13 further comprising:
generating one line of an identity matrix for each line of the locked coefficients; and
sending the packets out to the network.

15. The method of claim 14 wherein generating an n×n lower triangular matrix comprises generating a 3×3 lower triangular matrix.

16. The method of claim 15 wherein dividing plaintext into vectors of elements comprises dividing plaintext into vectors of three elements.

17. A system for data streaming in a network, the system comprising:
(a) a server node for dividing data into more than one group, each of the more than one group having a predetermined time of duration wherein for each group, a source node generates an n×n lower-triangular matrix A, in which n is the number of layers in the group wherein matrix A is used for encoding at the source only and each non-zero entry of matrix A is an element $a_{ij}$ chosen uniformly at random from all non-zero elements of the field $F_q\backslash\{0\}$ and the source divides the group into a plurality of vectors $\underline{b}^{(1)} \ldots \underline{b}^{(w)}$, each of the vectors having K symbols $S_1$-$S_K$ in which the $k^{th}$ symbol of each vector belongs to a corresponding one of the n layers in the group and wherein the number of vectors created is computed as size of group/n and wherein the source node encrypts at least one symbol of each vector $\underline{b}^{(i)}$ for each use of the encoding matrix wherein the output of the operation of a stream cypher is denoted as a symbol P with a random key $\underline{K}$ as $E(P, \underline{K})$ and applies the encoding matrix A successively to the information symbols to be sent to provide encoded information symbols which comprise a payload of one or more packets and the source node encrypts each line of a first matrix A with a corresponding layer key wherein the first matrix A corresponds to a locked coefficients matrix and generates an n×n identity matrix corresponding to the unlocked coefficients wherein each of the one or more packets comprise a header and the payload;
(b) a plurality of relay nodes; and
(c) one or more receiver nodes wherein the header comprises the locked and unlocked coefficients and encodes the one or more packets in the relay nodes in accordance with a random linear network coding (RLNC) protocol wherein algebraic coding is performed on unlocked coefficients, locked coefficients and payload and the relay nodes identify the layer of a packet by looking at the first non-zero position in the unlocked coefficients, and packets are mixed with packets of the same or lower layers only.

18. A method of streaming data comprising:
generating a multi-resolution data set;
applying a random linear network coding (RLNC) protocol to the multi-resolution data set such that each layer of the multi-resolution data set is provided having a corresponding set of network coding coefficients provided from the RLNC protocol;
encrypting a predetermined set of the network coding coefficients of the multi-resolution data set;
forming a plurality of packets, each of the packets having one or more encrypted network coding coefficients.

19. The method of claim 18 wherein forming a plurality of packets comprises packets having one or more encrypted network coding coefficients, one or more unencrypted coefficients and a payload.

20. The method of claim 18 wherein generating a multi-resolution data set comprises generating hierarchical wireless video data.

21. The method of claim 18 wherein encrypting a predetermined set of the network coding coefficients comprises limiting encryption to a predetermined set of network coding coefficients which is less than all of the network coding coefficients.

22. The method of claim 18 wherein
generating a multi-resolution data set comprises generating multi-resolution video coding; and
encrypting a predetermined set of the network coding coefficients comprises limiting encryption to a predetermined set of network coding coefficients in combination with the multi-resolution video coding.

23. A method of generating packets for transmission on a network, the method comprising:
- generating an n×n triangular matrix A with each non-zero element of the matrix having a value chosen uniformly at random out of all non-zero elements of a finite field;
- dividing plaintext data into a plurality of vectors with each of the vectors having a number of elements equal to n;
- multiplying the matrix by each of the vectors to generate a corresponding number of payloads;
- encrypting each line of the matrix A using one different key to generate a set of locked coefficients; and
- placing the each encrypted line in the header of each packet.

24. The method of claim 23 further comprising:
- placing the payloads in respective packets; and
- sending the packets out to the network.

25. The method of claim 23 wherein generating an n×n triangular matrix A comprises generating an n×n lower triangular matrix A.

26. The method of claim 23 further comprising encrypting the first position of each vector.

27. The method of claim 26 wherein encrypting the first position of each vector comprises encrypting the first position of each vector using a stream cypher.

* * * * *

UNITED STATES PATENT AND TRADEMARK OFFICE
CERTIFICATE OF CORRECTION

PATENT NO. : 9,923,714 B2
APPLICATION NO. : 14/822115
DATED : March 20, 2018
INVENTOR(S) : Luisa Lima et al.

It is certified that error appears in the above-identified patent and that said Letters Patent is hereby corrected as shown below:

Column 13, Line 38, delete "$C_i^{(x)} = (^{\min(l,)}/\sum/_{j=1})\, a_{ij}\, E(b_j^{(x)}, K_j^{(x)}) + (^i/\sum/_{i=m+1})\, a_{ii} b_i^{(x)}$" and replace with --$c_i^{(x)} = \sum_{j=1}^{\min(m,i)} a_{ij} E\left(b_j^{(x)}, K_j^{(x)}\right) + \sum_{l=m+1}^{i} a_{il} b_l^{(x)}$--.

Column 15, Line 49, delete "As described above-packets" and replace with --As described above, packets--.

Signed and Sealed this
Eighth Day of January, 2019

Andrei Iancu
*Director of the United States Patent and Trademark Office*